(12) United States Patent
Fallahi

(10) Patent No.: US 10,954,969 B2
(45) Date of Patent: Mar. 23, 2021

(54) SERVO GOVERNOR BY PWM

(71) Applicant: Shahin Fallahi, Mehrshahr Karaj (IR)

(72) Inventor: Shahin Fallahi, Mehrshahr Karaj (IR)

(*) Notice: Subject to any disclaimer, the term of this patent is extended or adjusted under 35 U.S.C. 154(b) by 310 days.

(21) Appl. No.: 16/059,314

(22) Filed: Aug. 9, 2018

(65) Prior Publication Data

US 2019/0017520 A1 Jan. 17, 2019

Related U.S. Application Data

(60) Provisional application No. 62/517,884, filed on Jun. 10, 2017.

(51) Int. Cl.
| | |
|---|---|
| *F15B 13/04* | (2006.01) |
| *F15B 9/09* | (2006.01) |
| *F15B 13/044* | (2006.01) |
| *F15B 13/16* | (2006.01) |
| *F03D 7/02* | (2006.01) |

(52) U.S. Cl.
CPC ............ *F15B 9/09* (2013.01); *F15B 13/0401* (2013.01); *F15B 13/044* (2013.01); *F15B 13/16* (2013.01); *F03D 7/0204* (2013.01); *F03D 7/0224* (2013.01); *F05B 2260/507* (2013.01); *F05B 2260/75* (2013.01); *F05B 2270/604* (2013.01); *F15B 2013/0409* (2013.01); *F15B 2211/30525* (2013.01); *F15B 2211/30575* (2013.01); *F15B 2211/328* (2013.01); *F15B 2211/6336* (2013.01); *F15B 2211/6656* (2013.01); *F15B 2211/7053* (2013.01); *F15B 2211/765* (2013.01)

(58) Field of Classification Search
CPC ...... F15B 9/09; F15B 13/0401; F15B 13/044; F15B 13/16; F15B 2211/765; F15B 2211/328
See application file for complete search history.

(56) References Cited

U.S. PATENT DOCUMENTS

| | | |
|---|---|---|
| 3,295,421 A | 1/1967 | Mccormick |
| 4,416,187 A | 11/1983 | Nystrom Per H. G. |
| 4,625,622 A | 12/1986 | Gunda |

(Continued)

OTHER PUBLICATIONS

Taghizadeh, Improving dynamic performances of PWM-driven servo-pneumatic systems via a novel pneumatic circuit, ISA Transactions, pp. 512-518, vol. 48, Issue 4, 2009.

(Continued)

*Primary Examiner* — Abiy Teka
(74) *Attorney, Agent, or Firm* — Summit Patent Group

(57) ABSTRACT

A servo actuator is provided which may comprise a controller configured to control a plurality of solenoid valves based upon an output signal. The plurality of solenoid valves may be used to control the position of the object. For example, a set of solenoid valves, of the plurality of solenoid valves, may be configured to conduct fluid from a tank into a first chamber of the cylinder, conduct fluid from the tank into a second chamber of the cylinder, conduct fluid from the second chamber of the cylinder into a first solenoid valve and/or conduct fluid from the first chamber of the cylinder into the first solenoid valve. The first solenoid valve, of the plurality of solenoid valves, may be configured to conduct fluid from the set of solenoid valves into a vent valve based upon a pulse width modulation (PWM) signal received from the controller.

20 Claims, 7 Drawing Sheets

(56) References Cited

U.S. PATENT DOCUMENTS 5,284,083 A * 2/1994 Vaslin .................... B64C 25/22
                                                      60/406
5,305,681 A * 4/1994 Devier ................. F15B 21/087
                                                      60/427
5,542,336 A * 8/1996 Larkin ..................... F15B 9/03
                                                      91/166

OTHER PUBLICATIONS

Akagi, Development and analysis of small-sized quasi-servo valve using onioff valves, Proceedings of SICE Annual Conference 2010, pp. 783-790, 2010.

* cited by examiner

SERVO GOVERNOR BY PWM

RELATED APPLICATION

This application claims the benefit of U.S. Provisional Application No. 62/517,884, filed Jun. 10, 2017, which is incorporated herein by reference in its entirety.

BACKGROUND

A servo actuator may be used to control a position of a piston of a cylinder. However, servo actuators may have complex design structures and/or may be expensive to produce. It may be beneficial for servo actuators to have a simpler design structure that is less expensive to produce. Further, servo actuators may have limited resources and/or may have limited capabilities.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a servo actuator is provided. The servo actuator may comprise a controller configured to control a plurality of solenoid valves based upon a feedback signal associated with a position of an object of a double-acting cylinder. The plurality of solenoid valves may comprise a set of one or more solenoid valves configured to conduct fluid from a tank into a first chamber of the double-acting cylinder, based upon a first signal received from the controller, in order to move the object in a first direction. Alternatively and/or additionally, the set of one or more solenoid valves may be configured to conduct fluid from the tank into a second chamber of the double-acting cylinder, based upon a second signal received from the controller, in order to move the object in a second direction, wherein the second direction is different than the first direction. Alternatively and/or additionally, the set of one or more solenoid valves may be configured to conduct fluid from the second chamber of the double-acting cylinder into a first solenoid valve while the object moves in the first direction, based upon the first signal. Alternatively and/or additionally, the set of one or more solenoid valves may be configured to conduct fluid from the first chamber of the double-acting cylinder into the first solenoid valve while the object moves in the second direction, based upon the second signal. The plurality of solenoid valves may comprise a first solenoid valve configured to conduct fluid from the set of one or more solenoid valves into a vent valve, based upon a pulse width modulation (PWM) signal received from the controller.

In an example, a servo actuator is provided. The servo actuator may comprise a controller configured to control a plurality of solenoid valves based upon a feedback signal associated with a position of an object of a double-acting cylinder. The plurality of solenoid valves may comprise a first solenoid valve configured to conduct fluid from a tank into a first chamber of the double-acting cylinder, based upon a first signal received from the controller, in order to move the object in a first direction. Alternatively and/or additionally, the first solenoid valve may be configured to conduct fluid from the first chamber of the double-acting cylinder into a vent valve while the object moves in a second direction, based upon a first PWM signal received from the controller, wherein the second direction is different than the first direction. The plurality of solenoid valves may comprise a second solenoid valve configured to conduct fluid from the tank into a second chamber of the double-acting cylinder, based upon a second signal received from the controller, in order to move the object in the second direction. The plurality of solenoid valves may comprise a third solenoid valve configured to conduct fluid from the second chamber of the double-acting cylinder into the vent valve while the object moves in the first direction, based upon a second PWM signal received from the controller.

In an example, a servo actuator is provided. The servo actuator may comprise a controller configured to control a plurality of solenoid valves based upon a feedback signal associated with a position of an object of a single-acting cylinder (e.g., a cylinder with spring return). The servo actuator may comprise a first solenoid valve configured to conduct fluid from a tank into a second solenoid valve, based upon a first signal received from the controller, in order to move the object in a first direction. The servo actuator may comprise a third solenoid valve configured to conduct fluid from the second solenoid valve to a vent valve, based upon a second signal received from the controller, while the object moves in a second direction, wherein the second direction is different than the first direction. The servo actuator may comprise the second solenoid valve configured to conduct fluid from the first solenoid valve into the single-acting cylinder, based upon a PWM signal, in order to move the object in the first direction. Alternatively and/or additionally, the second solenoid valve may be configured to conduct fluid from the single-acting cylinder into the third solenoid valve, based upon the PWM signal, while the object moves in the second direction.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of mechanical devices, electro-mechanical devices, electrical devices or any combination thereof.

Figure 1:
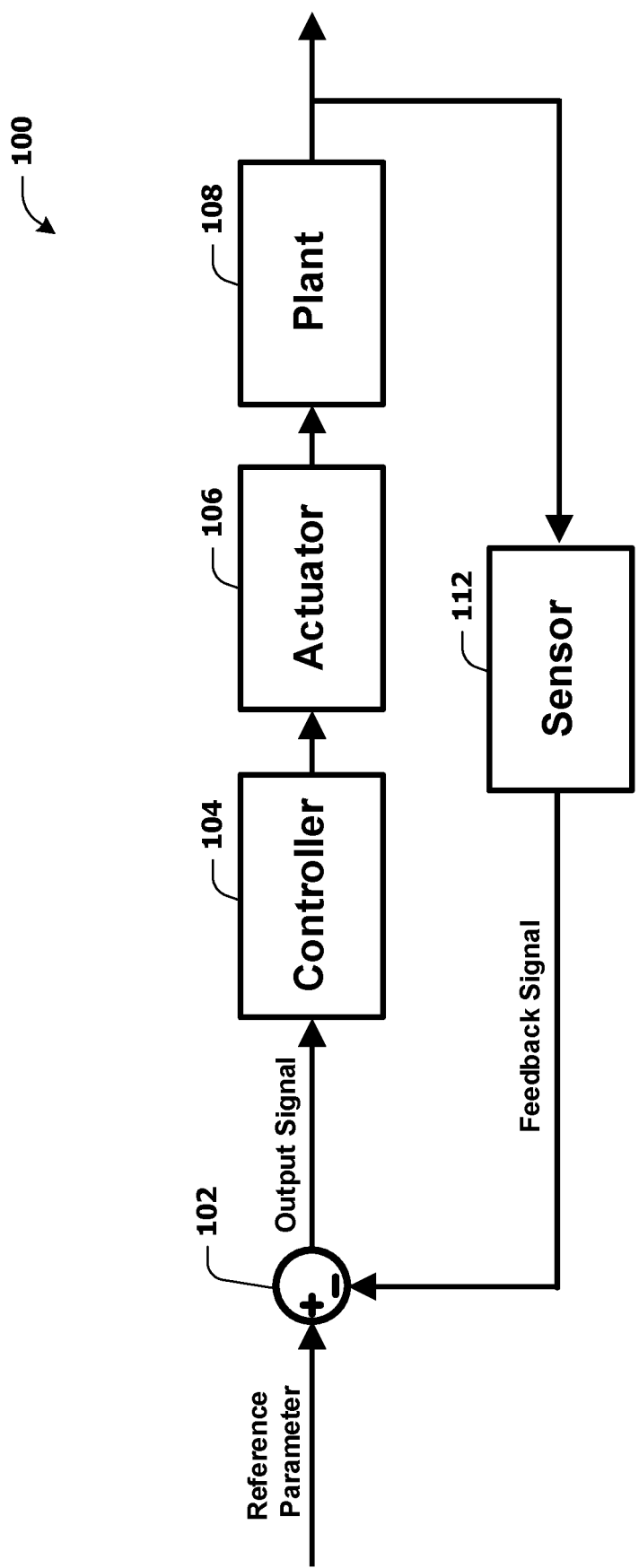
FIG. 1 is a component block diagram illustrating an exemplary system for implementing a servo actuator.

FIG. 1 presents a system 100 for implementing a servo actuator 106. For example, the system 100 may comprise a computing device 102, a controller 104, the servo actuator 106 (e.g., an electrohydraulic servo actuator, an electro-pneumatic servo actuator, etc.), a plant 108 and/or a sensor 112. The controller 104 may comprise a programmable logic controller (PLC), a proportional-integral-derivative (PID) controller (e.g., a three term controller) and/or a different type of controlling device and/or controlling method used to control elements (e.g., solenoid valves) of the servo actuator 106, based upon a feedback signal.

It may be appreciated that the servo actuator 106 may comprise structures and/or configurations (e.g., servo actuator structures and/or servo actuator configurations) incorporated herein and/or the server actuator 106 may employ one or more techniques incorporated herein. Alternatively and/or additionally, the servo actuator 106 may comprise other structures and/or configurations (e.g., servo actuator structures and/or servo actuator configurations) and/or may employ other techniques.

The servo actuator 106 may be used to control the plant 108. For example, the plant 108 may comprise a control valve, a turbine, a generator, a wind turbine, etc. For example, the servo actuator 106 may be used as a positioner (e.g., an electrohydraulic positioner, an electro-pneumatic positioner, etc.) to control a flow regulation associated with a control valve. For example, a size of flow passage of the control valve may be controlled using the servo actuator 106 and/or a cylinder (e.g., a piston of a double-acting cylinder and/or a single-acting cylinder) of the servo actuator 106.

Alternatively and/or additionally, the servo actuator 106 may be used as a governor (e.g., an electrohydraulic governor, an electro-pneumatic governor, etc.) to control a turbine speed (e.g., revolutions per minute (RPM)) of a turbine associated with a first power plant. For example, the turbine speed of the turbine may be associated with an electricity frequency (e.g., an alternating current (AC) frequency) of first output power of the first power plant. Accordingly, the electricity frequency of the first output power of the first power plant may be adjusted and/or controlled using the servo actuator 106 (e.g., by adjusting and/or controlling the turbine speed of the turbine). The first power plant may comprise a hydro power plant, a hydro power plant with a reverse pump, a steam power plant, a gas power plant, a nuclear power plant, etc.

Alternatively and/or additionally, the servo actuator 106 may be used as a governor (e.g., an electrohydraulic governor, an electro-pneumatic governor, etc.) to control an electric charge of a generator associated with a second power plant. For example, the electric charge of the generator may be associated with an electricity frequency of second output power of the second power plant. Accordingly, the electricity frequency of the second output power of the second power plant may be adjusted and/or controlled using the servo actuator 106 (e.g., by adjusting and/or controlling the electric charge of the generator). The second power plant may comprise a hydro power plant, a hydro power plant with a reverse pump, a steam power plant, a gas power plant, a nuclear power plant, etc.

Alternatively and/or additionally, the servo actuator 106 may be used as an actuator (e.g., an electrohydraulic actuator, an electro-pneumatic actuator, etc.) to control a direction associated with a yaw axis of a first wind turbine. For example, the direction associated with the yaw axis may be controlled based upon one or more wind-conditions, a wind direction, etc. such that the first wind turbine may face a direction of wind.

Alternatively and/or additionally, the servo actuator 106 may be used as an actuator (e.g., an electrohydraulic actuator, an electro-pneumatic actuator, etc.) to control a pitch angle of a second wind turbine. For example, the pitch angle of the second wind turbine may be associated with a rotational speed of a rotor associated with the second wind turbine. For example, the pitch angle may be controlled based upon one or more wind-conditions such that an efficiency and/or power generation of the second wind turbine may be maximized (e.g., and/or increased).

In some examples, the system 100 may comprise a feedback device. The feedback device may comprise the sensor 112 and/or the computing device 102. For example, the sensor 112 may detect one or more variables associated with the position of an object (e.g., the piston) of the cylinder (e.g., the double-acting cylinder and/or the single-acting cylinder) of the servo actuator 106. The one or more variables may correspond to the position (e.g., detected position) of the object, a speed of the object and/or one or more different types of measurements associated with the position of the object. A feedback signal comprising indications of the one or more variables may be transmitted to the computing device 102. For example, the feedback signal may comprise an indication of the position of the object, the speed of the object and/or the one or more different types of measurements associated with the position of the object.

The computing device 102 may generate an output signal (e.g., an error signal) based upon a comparison of the one or more variables with a reference parameter (e.g., a desired value). For example, an operation (e.g., a mathematical operation comprising subtraction, addition, differentiation, integration and/or proportional calculation) may be performed on the one or more variables and the reference parameter to generate the output signal. The controller 104 may control the servo actuator 106 (e.g., and/or one or more solenoid valves of the servo actuator 106) based upon the output signal.

In some examples, the sensor 112 may be a position sensor and/or a different type of sensor. For example, the sensor 112 may detect a position of the object of the cylinder (e.g., the feedback signal may comprise an indication of the position of the object). Alternatively and/or additionally, the reference parameter may comprise an indication of a desired position of the object of the cylinder. Accordingly, the output signal may comprise an indication of a difference between the position of the object and the desired position of the object (e.g., and/or an indication of a different type of measurement and/or calculation associated with the position of the object and the desired position of the object).

Alternatively and/or additionally, the sensor 112 may detect the turbine speed of the turbine and/or the electricity frequency of the first output power of the first power plant (e.g., the feedback signal may comprise an indication of the turbine speed and/or an indication of the electricity frequency of the first output power). Alternatively and/or additionally, the reference parameter may comprise an indication of a desired turbine speed and/or an indication of a desired electricity frequency of the first output power. Accordingly, the output signal may comprise an indication of a difference between the turbine speed and the desired turbine speed (e.g., and/or an indication of a different type of measurement and/or calculation associated with the turbine speed and the desired turbine speed). Alternatively and/or additionally, the feedback signal may comprise an indication of a difference between the electricity frequency of the first output power and the desired electricity frequency of the first output power (e.g., and/or an indication of a different type of measurement and/or calculation associated with the electricity frequency of the first output power and the desired electricity frequency of the first output power).

Alternatively and/or additionally, the sensor 112 may detect the electric charge of the generator and/or the electricity frequency of the second output power of the second power plant (e.g., the feedback signal may comprise an indication of the electric charge and/or an indication of the electricity frequency of the second output power). Alternatively and/or additionally, the reference parameter may comprise an indication of a desired electric charge and/or an indication of a desired electricity frequency of the second output power. Accordingly, the output signal may comprise an indication of a difference between the electric charge and the desired electric charge (e.g., and/or an indication of a different type of measurement and/or calculation associated with the electric charge and the desired electric charge). Alternatively and/or additionally, the output signal may comprise an indication of a difference between the electricity frequency of the second output power and the desired electricity frequency of the second output power (e.g., and/or an indication of a different type of measurement and/or calculation associated with the electricity frequency of the second output power and the desired electricity frequency of the second output power).

Alternatively and/or additionally, the sensor 112 may detect the direction associated with the yaw axis of the first wind turbine (e.g., the feedback signal may comprise an indication of the direction of the first wind turbine). Alternatively and/or additionally, the reference parameter may comprise an indication of a desired direction associated with the yaw axis of the first wind turbine. Accordingly, the output signal may comprise an indication of a difference between the direction of the first wind turbine and the desired direction of the first wind turbine (e.g., and/or an indication of a different type of measurement and/or calculation associated with the direction of the first wind turbine and the desired direction of the first wind turbine).

Alternatively and/or additionally, the sensor 112 may detect the direction associated with the pitch angle of the second wind turbine and/or the rotational speed of the rotor associated with the second wind turbine (e.g., the feedback signal may comprise an indication of the pitch angle of the second wind turbine and/or an indication of the rotational speed of the rotor). Alternatively and/or additionally, the reference parameter may comprise an indication of a desired pitch angle of the second wind turbine and/or a desired rotational speed of the rotor. Accordingly, the output signal may comprise an indication of a difference between the pitch angle of the second wind turbine and the desired pitch angle of the second wind turbine (e.g., and/or an indication of a different type of measurement and/or calculation associated with the pitch angle of the second wind turbine and the desired pitch angle of the second wind turbine). Alternatively and/or additionally, the output signal may comprise an indication of a difference between the rotational speed of the rotor and the desired rotational speed of the rotor (e.g., and/or an indication of a different type of measurement and/or calculation associated with the rotational speed of the rotor and the desired rotational speed of the rotor).

Figure 2:
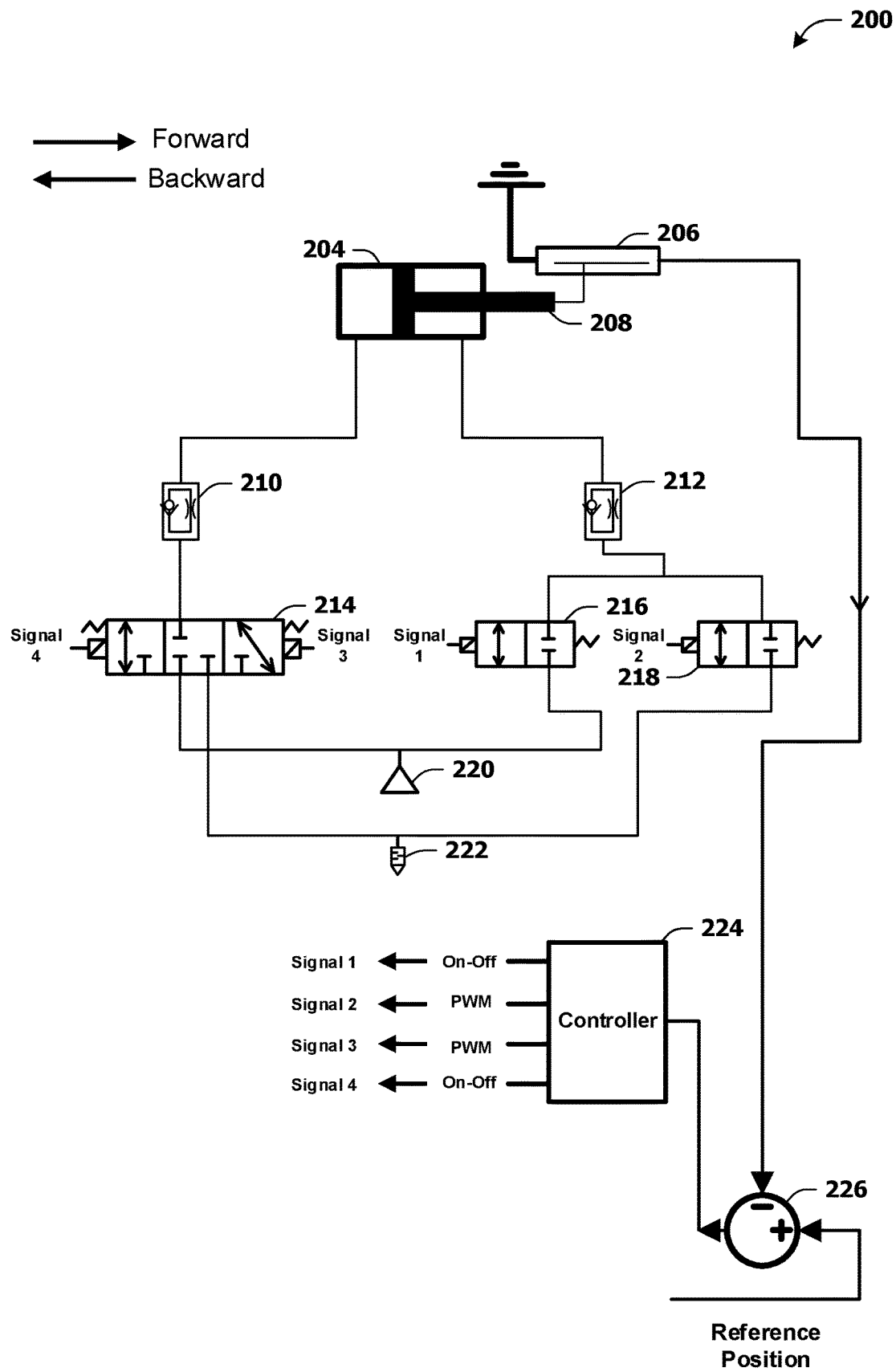
FIG. 2 is a component block diagram illustrating an exemplary system comprising a servo actuator.

FIG. 2 presents a structure of a system 200 comprising a servo actuator (e.g., an electrohydraulic servo actuator, an electro-pneumatic servo actuator, etc.). For example, the servo actuator may comprise a double-acting cylinder 204. The servo actuator may be configured to control a position of an object of the double-acting cylinder 204. In some examples, the object may be a piston 208. The piston 208 may move in a first direction and/or a second direction. The first direction may be labeled forward direction. The second direction may be labeled backward direction.

The servo actuator may comprise a first solenoid valve 214 (e.g., an on/off solenoid valve), a second solenoid valve 216 (e.g., an on/off solenoid valve) and/or a third solenoid valve 218 (e.g., an on/off solenoid valve). For example, the first solenoid valve 214 may be a three port three position 3/3-way solenoid valve. Alternatively and/or additionally, the first solenoid valve 214 may be a different type of solenoid valve. The second solenoid valve 216 may be a two port two position 2/2-way solenoid valve. Alternatively and/or additionally, the second solenoid valve 216 may be a different type of solenoid valve. The third solenoid valve 218 may be a 2/2-way solenoid valve. Alternatively and/or additionally, the third solenoid valve 218 may be a different type of solenoid valve.

In some examples, the system 200 may comprise a tank 220. The tank 220 may provide fluid used by the servo actuator. For example, the tank 220 may comprise compressed gas (e.g., the tank 220 may be a pneumatic tank and/or the fluid may be gas). The gas may be air and/or one or more inert gases. Alternatively and/or additionally, the tank 220 may comprise liquid (e.g., the tank 220 may be a hydraulic tank and/or the fluid may be liquid). Alternatively and/or additionally, the system 200 may comprise a vent valve 222. The vent valve 222 may vent fluid from the servo actuator and/or the double-acting cylinder 204. Alternatively and/or additionally, if the fluid is liquid and/or the system 200 is a hydraulic system, the system 200 may comprise a drain valve (in place of the vent valve 222) which may drain liquid from the servo actuator and/or the double-acting cylinder. In some examples, the vent valve 222 (e.g., and/or the drain valve) may comprise a silencing device in order to mitigate and/or reduce noise associated with venting fluid from the servo actuator (e.g., to reduce noise pollution).

In some examples, the system 200 may comprise a controller 224, a sensor 206 and/or a computing device 226. For example, the sensor 206 may be a position sensor and/or a different type of sensor. For example, the sensor 206 may detect one or more variables associated with a position of the piston 208. The sensor 206 may transmit a feedback signal comprising indications of the one or more variables to the computing device 226. The computing device 226 may generate an output signal (e.g., an error signal) based upon a comparison of the one or more variables with a reference parameter associated with a reference position of the piston 208 (e.g., a desired position of the piston 208).

For example, an operation (e.g., a mathematical operation comprising subtraction, addition, differentiation, integration and/or proportional calculation) may be performed on the one or more variables and the reference parameter to generate the output signal. The output signal may be transmitted to the controller 224. The controller 224 may control the first solenoid valve 214, the second solenoid valve 216 and/or the third solenoid valve 218 based upon the output signal.

For example, the controller 224 may generate a first signal 1 (e.g., "Signal 1"), a second signal 2 (e.g., "Signal 2"), a third signal 3 (e.g., "Signal 3") and/or a fourth signal 4 (e.g., "Signal 4"). The first signal 1 and/or the fourth signal 4 may be on/off signals. For example, the first signal 1 and/or the fourth signal 4 may switch between a first state (e.g., a voltage representing 0) corresponding to deactivation (e.g., wherein a controlled solenoid valve may be de-energized and/or wherein a controlled solenoid valve may operate in a state of a plurality of states) and a second state (e.g., a voltage representing 1) corresponding to activation (e.g., wherein a controlled solenoid valve may be energized and/or wherein a controlled solenoid valve may operate in a state of a plurality of states). Alternatively and/or additionally, the second signal 2 and/or the third signal 3 may be pulse width modulation (PWM) signals.

In some examples, the first solenoid valve 214 may be controlled using the fourth signal 4 and/or the third signal 3. Alternatively and/or additionally, the second solenoid valve 216 may be controlled using the first signal 1. Alternatively and/or additionally, the third solenoid valve 218 may be controlled using the second signal 2.

In some examples, the first solenoid valve 214 may be configured to conduct fluid from the tank 220 into a first chamber of the double-acting cylinder 204 (e.g., the first chamber of the double-acting cylinder 204 may be associated with a left side of the double-acting cylinder 204 as shown in FIG. 2), based upon the fourth signal 4. For example, responsive to the fourth signal 4 having the second state, fluid may be conducted from the tank 220 into the first chamber of the double-acting cylinder 204 by the first solenoid valve 214. In some examples, while the first solenoid valve 214 conducts fluid from the tank 220 into the first chamber of the double-acting cylinder 204, the first signal 1 may have the first state and/or the second solenoid valve 216 may be closed.

The fluid being conducted from the tank 220 into the first chamber of the double-acting cylinder 204 may cause the piston 208 to move in the first direction. For example, fluid may enter the first chamber of the double-acting cylinder 204 such that a first portion of the double-acting cylinder 204 has a first pressure level (e.g., a first level of air pressure). The first portion of the double-acting cylinder 204 may be on a first side of the piston 208 (e.g., the first portion of the double-acting cylinder 204 may be on a left side of the piston 208 as shown in FIG. 2). Alternatively and/or additionally, a second portion of the double-acting cylinder 204 may comprise a second pressure level (e.g., a second level of air pressure). The second portion of the double-acting cylinder 204 may be on a second side of the piston 208 (e.g., the second portion of the double-acting cylinder 204 may be on a right side of the piston 208 as shown in FIG. 2). The first pressure level may be higher than the second pressure level which may cause the piston 208 to move in the first direction (e.g., forward direction).

While the piston 208 moves in the first direction and/or while the fourth signal 4 has the second state, the third solenoid valve 218 may conduct fluid from a second chamber of the double-acting cylinder 204 (e.g., and/or the second portion of the double-acting cylinder 204) into the vent valve 222 (e.g., the second chamber of the double-acting cylinder 204 may be associated with a right side of the double-acting cylinder 204 as shown in FIG. 2), based upon the second signal 2. In some examples, a PWM period and/or a PWM frequency (e.g., associated with a clock of the PWM signal) of the second signal 2 may be based upon capabilities (e.g., switching capabilities) of the third solenoid valve 218.

In some examples, a first duty cycle of the second signal 2 may be based upon the output signal. For example, the first duty cycle may be based upon a position difference between the position of the piston 208 and the reference position (e.g., associated with the piston 208). For example, the first duty cycle may be proportional to the position difference. For example, a first position difference that is larger than a second position difference may be associated with a duty cycle that is higher than a duty cycle associated with the second position difference. For example, as the position difference decreases (e.g., and/or as the piston 208 moves in the first direction), the first duty cycle may decrease. For example, the first duty cycle may be 100% (e.g., or a different value) when the position difference is a maximum position difference and/or the first duty cycle may be 0% (e.g., or a different value) when the position difference is zero.

In some examples, the system 200 may comprise a first flow control valve 212 configured to regulate flow of fluid moving from the second chamber of the double-acting cylinder 204 to the third solenoid valve 218 while the piston 208 moves in the first direction. For example, a size of flow passage of the first flow control valve 212 may be set manually. Alternatively and/or additionally, the size of flow passage of the first flow control valve 212 may be set digitally.

In some examples, the second solenoid valve 216 may be configured to conduct fluid from the tank 220 into the second chamber of the double-acting cylinder 204, based upon the first signal 1. For example, responsive to the first signal 1 having the second state, the second solenoid valve 216 may be activated (e.g., energized) and fluid may be conducted from the tank 220 into the second chamber of the double-acting cylinder 204. In some examples, while the second solenoid valve 216 conducts fluid from the tank 220 into the second chamber of the double-acting cylinder 204, the fourth signal 4 may have the first state and/or the first solenoid valve 214 may not conduct fluid from the tank 220 into the first chamber of the double-acting cylinder 204.

The fluid being conducted from the tank 220 into the second chamber of the double-acting cylinder 204 may cause the piston 208 to move in the second direction. For example, fluid may enter the second chamber of the double-acting cylinder 204 such that the second portion of the double-acting cylinder 204 has a third pressure level (e.g., a third level of air pressure). Alternatively and/or additionally, the first portion of the double-acting cylinder 204 may comprise a fourth pressure level (e.g., a fourth level of air pressure). The third pressure level may be higher than the fourth pressure level which may cause the piston 208 to move in the second direction (e.g., backward direction).

While the piston 208 moves in the second direction and/or while the second solenoid valve 216 is activated (e.g., energized), the first solenoid valve 214 may conduct fluid from the first chamber of the double-acting cylinder 204 (e.g., and/or the first portion of the double-acting cylinder 204) into the vent valve 222, based upon the third signal 3. In some examples, a PWM period and/or a PWM frequency (e.g., associated with a clock of the PWM signal) of the third signal 3 may be based upon capabilities (e.g., switching capabilities) of the first solenoid valve 214.

In some examples, a second duty cycle of the third signal 3 may be based upon the output signal. For example, the first duty cycle may be based upon a position difference between the position of the piston 208 and the reference position (e.g., which may be changed based upon the piston 208 moving in the second direction). For example, the second duty cycle may be proportional to the position difference. For example, a third position difference that is larger than a fourth position difference may be associated with a duty cycle that is higher than a duty cycle associated with the fourth position difference. For example, as the position difference decreases (e.g., and/or as the piston 208 moves in the second direction), the second duty cycle may decrease. For example, the second duty cycle may be 100% (e.g., or a different value) when the position difference is a maximum position difference and/or the second duty cycle may be 0% (e.g., or a different value) when the position difference is zero.

In some examples, the system 200 may comprise a second flow control valve 210 configured to regulate flow of fluid moving from the first chamber of the double-acting cylinder 204 to the first solenoid valve 214 while the piston 208 moves in the second direction. For example, a size of flow passage of the second flow control valve 210 may be set manually. Alternatively and/or additionally, the size of flow passage of the second flow control valve 210 may be set digitally.

Figure 3:
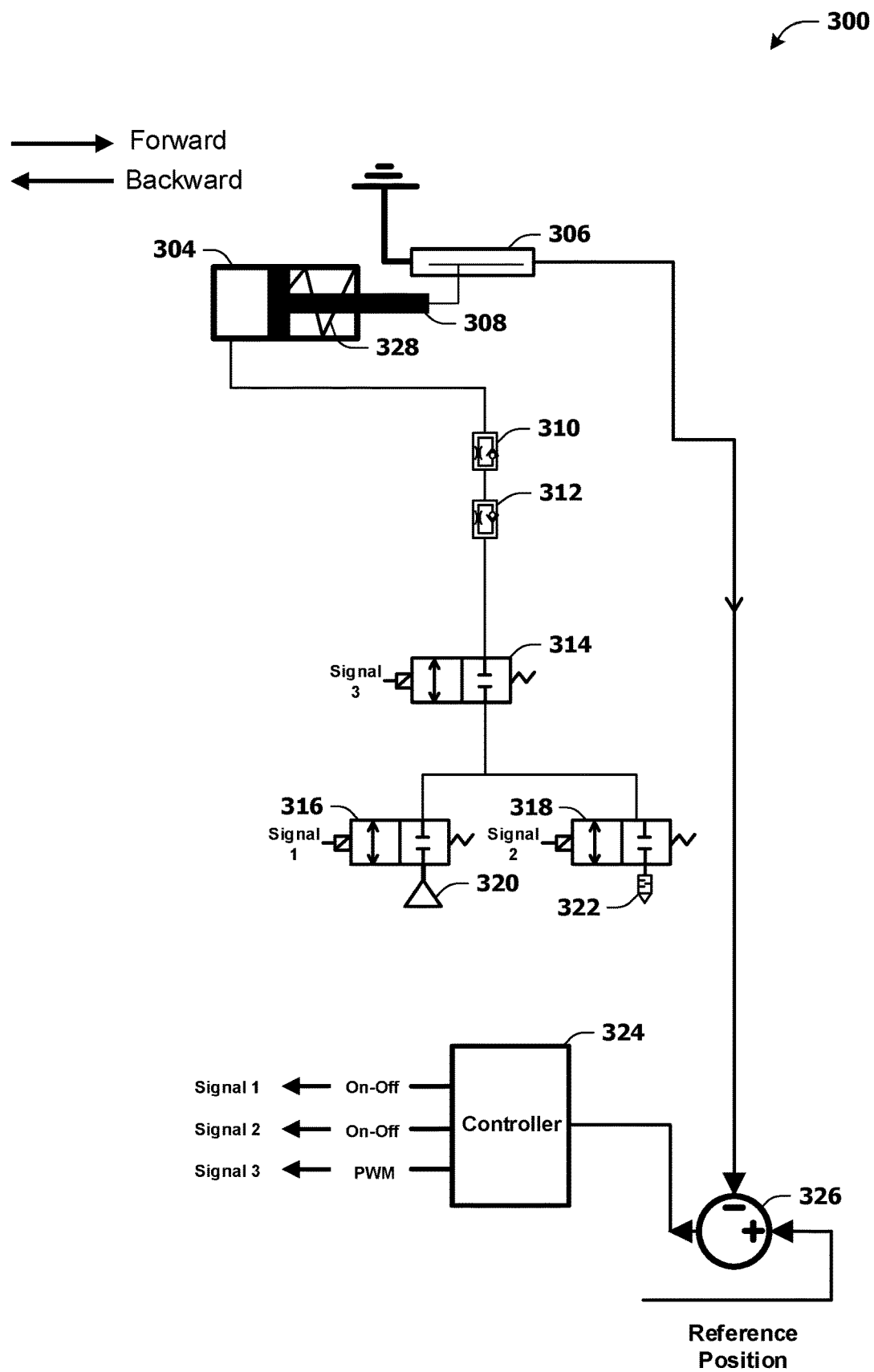
FIG. 3 is a component block diagram illustrating an exemplary system comprising a servo actuator.

FIG. 3 presents a structure of a system 300 comprising a servo actuator (e.g., an electrohydraulic servo actuator, an electro-pneumatic servo actuator, etc.). For example, the servo actuator may comprise a single-acting cylinder 304 (e.g., a cylinder with spring return). The servo actuator may be configured to control a position of an object of the single-acting cylinder 304. In some examples, the object may be a piston 308. The piston 308 may move in a first direction and/or a second direction. The first direction may be labeled forward direction. The second direction may be labeled backward direction. For example, the piston 308 may move in the second direction (e.g., to a home position) using a spring 328 of the single-acting cylinder 304.

The servo actuator may comprise a first solenoid valve 314 (e.g., an on/off solenoid valve), a second solenoid valve 316 (e.g., an on/off solenoid valve) and/or a third solenoid valve 318 (e.g., an on/off solenoid valve). For example, the first solenoid valve 314 may be a 2/2-way solenoid valve. Alternatively and/or additionally, the first solenoid valve 314 may be a different type of solenoid valve. The second solenoid valve 316 may be a 2/2-way solenoid valve. Alternatively and/or additionally, the second solenoid valve 316 may be a different type of solenoid valve. The third solenoid valve 318 may be a 2/2-way solenoid valve. Alternatively and/or additionally, the third solenoid valve 318 may be a different type of solenoid valve.

In some examples, the system 300 may comprise a tank 320. The tank 320 may provide fluid used by the servo actuator. For example, the tank 320 may comprise compressed gas. The gas may be air and/or one or more inert gases. Alternatively and/or additionally, the tank 320 may comprise liquid. Alternatively and/or additionally, the system 300 may comprise a vent valve 322. The vent valve 322 may vent fluid from the servo actuator and/or the single-acting cylinder 304. In some examples, the vent valve 322 may comprise a silencing device in order to mitigate and/or reduce noise associated with venting fluid from the servo actuator (e.g., to reduce noise pollution).

In some examples, the system 300 may comprise a controller 324, a sensor 306 and/or a computing device 326. For example, the sensor 306 may be a position sensor and/or a different type of sensor. For example, the sensor 306 may detect one or more variables associated with a position of the piston 308. The sensor 306 may transmit a feedback signal comprising indications of the one or more variables to the computing device 326. The computing device 326 may generate an output signal (e.g., an error signal) based upon a comparison of the one or more variables with a reference parameter associated with a reference position of the piston 308 (e.g., a desired position of the piston 308).

For example, an operation (e.g., a mathematical operation comprising subtraction, addition, differentiation, integration and/or proportional calculation) may be performed on the one or more variables and the reference parameter to generate the output signal. The output signal may be transmitted to the controller 324. The controller 324 may control the first solenoid valve 314, the second solenoid valve 316 and/or the third solenoid valve 318 based upon the output signal.

For example, the controller 324 may generate a first signal 1 (e.g., "Signal 1"), a second signal 2 (e.g., "Signal 2") and/or a third signal 3 (e.g., "Signal 3"). The first signal 1 and/or the second signal 2 may be on/off signals. For example, the first signal 1 and/or the second signal 2 may switch between a first state (e.g., a voltage representing 0) corresponding to deactivation (e.g., wherein a controlled solenoid valve may be de-energized and/or wherein a controlled solenoid valve may operate in a state of a plurality of states) and a second state (e.g., a voltage representing 1) corresponding to activation (e.g., wherein a controlled solenoid valve may be energized and/or wherein a controlled solenoid valve may operate in a state of a plurality of states). Alternatively and/or additionally, the third signal 3 may be a PWM signal.

In some examples, the first solenoid valve 314 may be controlled using the third signal 3. Alternatively and/or additionally, the second solenoid valve 316 may be controlled using the first signal 1. Alternatively and/or additionally, the third solenoid valve 318 may be controlled using the second signal 2.

In some examples, the second solenoid valve 316 may be configured to conduct fluid from the tank 320 into the first solenoid valve 314 based upon the first signal 1. For example, responsive to the first signal 1 having the second state, the second solenoid valve 316 may be activated (e.g., energized) and fluid may be conducted from the tank 320 into the first solenoid valve 314. In some examples, while the second solenoid valve 316 conducts fluid from the tank 320 into the first solenoid valve 314, the second signal 2 may have the first state and/or the third solenoid valve 318 may be closed.

While the second solenoid valve 316 is activated (e.g., energized), the first solenoid valve 314 may conduct fluid from the second solenoid valve 316 into the single-acting cylinder 304 based upon the third signal 3. In some examples, a PWM period and/or a PWM frequency (e.g., associated with a clock of the PWM signal) of the second signal 3 may be based upon capabilities (e.g., switching capabilities) of the first solenoid valve 314. The fluid being conducted from the first solenoid valve 314 into the single-acting cylinder 304 may cause the piston 308 to move in the first direction. For example, fluid may enter the single-acting cylinder 304 which may cause the piston 308 to move in the first direction (e.g., forward direction).

In some examples, a first duty cycle of the third signal 3 may be based upon the output signal. For example, the first duty cycle may be based upon a position difference between the position of the piston 308 and the reference position (e.g., associated with the piston 308). For example, the first duty cycle may be proportional to the position difference. For example, a first position difference that is larger than a second position difference may be associated with a duty cycle that is higher than a duty cycle associated with the second position difference. For example, as the position difference decreases (e.g., and/or as the piston 308 moves in the first direction), the first duty cycle may decrease. For example, the first duty cycle may be 100% (e.g., or a different value) when the position difference is a maximum position difference and/or the first duty cycle may be 0% (e.g., or a different value) when the position difference is zero.

In some examples, the system 300 may comprise a first flow control valve 310 configured to regulate flow of fluid moving from the first solenoid valve 314 to the single-acting cylinder 304 while the piston 308 moves in the first direction. For example, a size of flow passage of the first flow control valve 310 may be set manually. Alternatively and/or additionally, the size of flow passage of the first flow control valve 310 may be set digitally.

In some examples, while the piston 308 moves in the second direction (e.g., as a result of the spring 328), the first solenoid valve 314 may be configured to conduct fluid from the single-acting cylinder 304 into the third solenoid valve 318 based upon the third signal 3. In some examples, the first duty cycle of the third signal 3 may be based upon the output signal. For example, the first duty cycle may be based upon a position difference between the position of the piston 308 and the reference position (e.g., which may be changed based upon the piston 308 moving in the second direction). For example, the first duty cycle may be proportional to the position difference. For example, a third position difference that is larger than a fourth position difference may be associated with a duty cycle that is higher than a duty cycle associated with the fourth position difference. For example, as the position difference decreases (e.g., and/or as the piston 308 moves in the second direction), the first duty cycle may decrease. For example, the first duty cycle may be 100% (e.g., or a different value) when the position difference is a maximum position difference and/or the first duty cycle may be 0% (e.g., or a different value) when the position difference is zero.

In some examples, the system 300 may comprise a second flow control valve 312 configured to regulate flow of fluid moving from the first solenoid valve 314 to the third solenoid valve 318 while the object moves in the second direction. For example, a size of flow passage of the second flow control valve 312 may be set manually. Alternatively and/or additionally, the size of flow passage of the second flow control valve 312 may be set digitally.

In some examples, while the piston 308 moves in the second direction, the third solenoid valve 318 may be configured to conduct fluid from the first solenoid valve 314 to the vent valve 322. For example, responsive to the second signal 2 having the second state, the third solenoid valve 318 may be activated (e.g., energized) and/or fluid may be conducted from the first solenoid valve 314 to the vent valve 322. In some examples, while the third solenoid valve 318 conducts fluid from the first solenoid valve 314 to the vent valve 322, the first signal 1 may have the first state and/or the second solenoid valve 316 may be closed.

Figure 4:
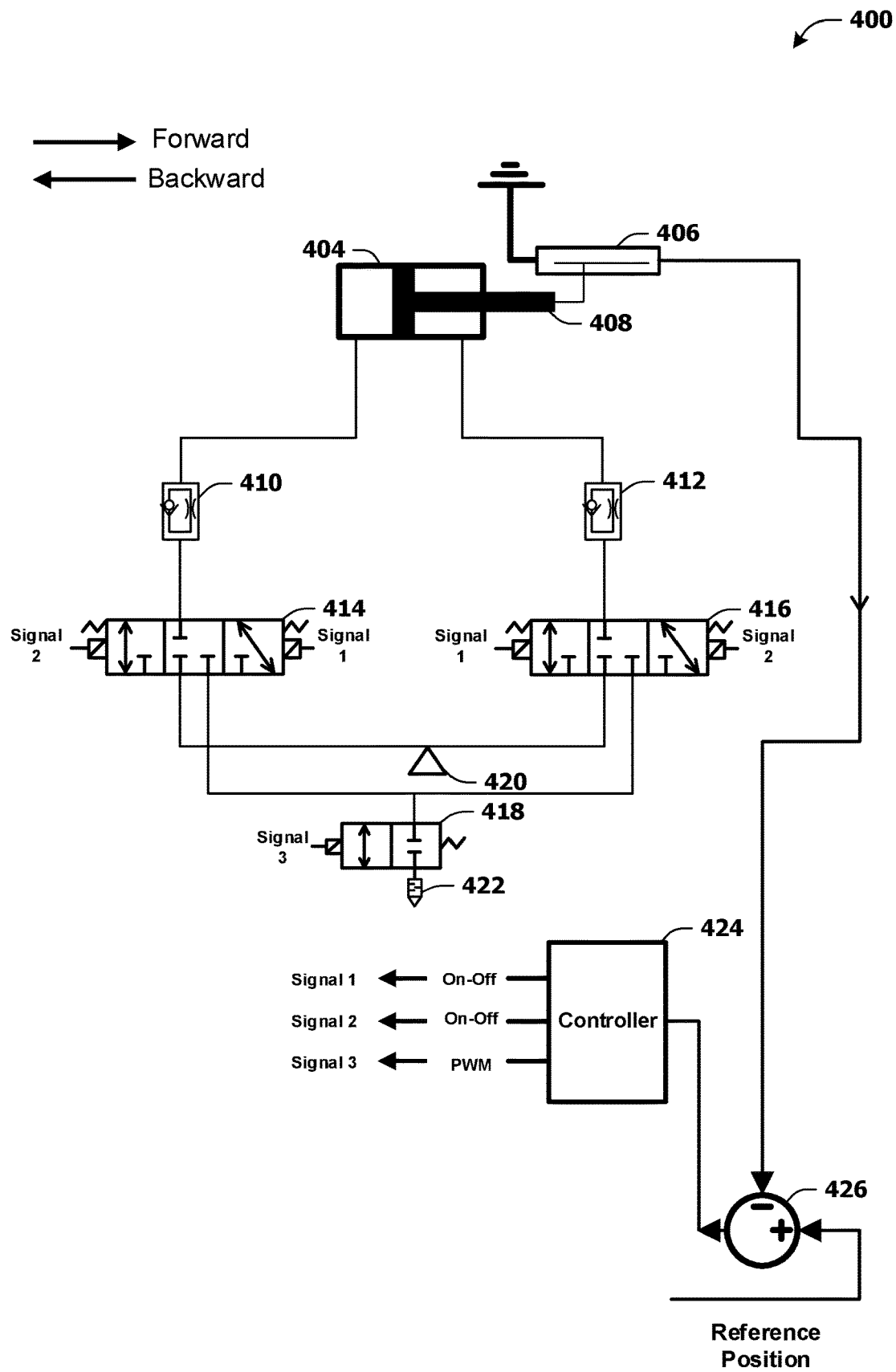
FIG. 4 is a component block diagram illustrating an exemplary system comprising a servo actuator.

FIG. 4 presents a structure of a system 400 comprising a servo actuator (e.g., an electrohydraulic servo actuator, an electro-pneumatic servo actuator, etc.). For example, the servo actuator may comprise a double-acting cylinder 404. The servo actuator may be configured to control a position of an object of the double-acting cylinder 404. In some examples, the object may be a piston 408. The piston 408 may move in a first direction and/or a second direction. The first direction may be labeled forward direction. The second direction may be labeled backward direction.

The servo actuator may comprise a first solenoid valve 414 (e.g., an on/off solenoid valve), a second solenoid valve 416 (e.g., an on/off solenoid valve) and/or a third solenoid valve 418 (e.g., an on/off solenoid valve). For example, the first solenoid valve 414 may be a 3/3-way solenoid valve. Alternatively and/or additionally, the first solenoid valve 414 may be a different type of solenoid valve. The second solenoid valve 416 may be a 3/3-way solenoid valve. Alternatively and/or additionally, the second solenoid valve 416 may be a different type of solenoid valve. The third solenoid valve 418 may be a 2/2-way solenoid valve. Alternatively and/or additionally, the third solenoid valve 418 may be a different type of solenoid valve.

In some examples, the system 400 may comprise a tank 420. The tank 420 may provide fluid used by the servo actuator. For example, the tank 420 may comprise compressed gas. The gas may be air and/or one or more inert gases. Alternatively and/or additionally, the tank 420 may comprise liquid. Alternatively and/or additionally, the system 400 may comprise a vent valve 422. The vent valve 422 may vent fluid from the servo actuator and/or the double-acting cylinder 404. In some examples, the vent valve 422 may comprise a silencing device in order to mitigate and/or reduce noise associated with venting fluid from the servo actuator (e.g., to reduce noise pollution).

In some examples, the system 400 may comprise a controller 424, a sensor 406 and/or a computing device 426. For example, the sensor 406 may be a position sensor and/or a different type of sensor. For example, the sensor 406 may detect one or more variables associated with a position of the piston 408. The sensor 406 may transmit a feedback signal comprising indications of the one or more variables to the computing device 426. The computing device 426 may generate an output signal (e.g., an error signal) based upon a comparison of the one or more variables with a reference parameter associated with a reference position of the piston 408 (e.g., a desired position of the piston 408).

For example, an operation (e.g., a mathematical operation comprising subtraction, addition, differentiation, integration and/or proportional calculation) may be performed on the one or more variables and the reference parameter to generate the output signal. The output signal may be transmitted to the controller 424. The controller 424 may control the first solenoid valve 414, the second solenoid valve 416 and/or the third solenoid valve 418 based upon the output signal.

For example, the controller 424 may generate a first signal 1 (e.g., "Signal 1"), a second signal 2 (e.g., "Signal 2") and/or a third signal 3 (e.g., "Signal 3"). The first signal 1 and/or the second signal 2 may be on/off signals. For example, the first signal 1 and/or the second signal 2 may switch between a first state (e.g., a voltage representing 0) corresponding to deactivation (e.g., wherein a controlled solenoid valve may be de-energized and/or a controlled solenoid valve may operate in a state of a plurality of states) and a second state (e.g., a voltage representing 1) corresponding to activation (e.g., wherein a controlled solenoid valve may be energized and/or a controlled solenoid valve may operate in a state of a plurality of state). Alternatively and/or additionally, the third signal 3 may be a PWM signal.

In some examples, the first solenoid valve 414 may be controlled using the first signal 1 and/or the second signal 2. Alternatively and/or additionally, the second solenoid valve 416 may be controlled using the first signal 1 and/or the second signal 2. Alternatively and/or additionally, the third solenoid valve 418 may be controlled using the third signal 3.

In some examples, the first solenoid valve 414 may be configured to conduct fluid from the tank 420 into a first chamber of the double-acting cylinder 404 (e.g., the first chamber of the double-acting cylinder 404 may be associated with a left side of the double-acting cylinder 404 as shown in FIG. 4), based upon the second signal 2 and/or the first signal 1. For example, responsive to the second signal 2 having the second state, fluid may be conducted from the tank 420 into the first chamber of the double-acting cylinder 404 by the first solenoid valve 414. In some examples, while the first solenoid valve 414 conducts fluid from the tank 420 into the first chamber of the double-acting cylinder 404, the second solenoid valve 416 may not conduct fluid from the tank 420 into the double-acting cylinder 404.

The fluid being conducted from the tank 420 into the first chamber of the double-acting cylinder 404 may cause the piston 408 to move in the first direction. For example, fluid may enter the first chamber of the double-acting cylinder 404 such that a first portion of the double-acting cylinder 404 has a first pressure level (e.g., a first level of air pressure). The first portion of the double-acting cylinder 404 may be on a first side of the piston 408 (e.g., the first portion of the double-acting cylinder 404 may be on a left side of the piston 408 as shown in FIG. 4). Alternatively and/or additionally, a second portion of the double-acting cylinder 404 may comprise a second pressure level (e.g., a second level of air pressure). The second portion of the double-acting cylinder 404 may be on a second side of the piston 408 (e.g., the second portion of the double-acting cylinder 404 may be on a right side of the piston 408 as shown in FIG. 4). The first pressure level may be higher than the second pressure level which may cause the piston 408 to move in the first direction (e.g., forward direction).

While the piston 408 moves in the first direction, the second solenoid valve 416 may conduct fluid from a second chamber of the double-acting cylinder 404 (e.g., and/or the second portion of the double-acting cylinder 404) into the third solenoid valve 418, based upon the second signal 2 and/or the first signal 1 (e.g., the second chamber of the double-acting cylinder 404 may be associated with a right side of the double-acting cylinder 404 as shown in FIG. 4). In some examples, the system 400 may comprise a first flow control valve 412 configured to regulate flow of fluid moving from the second chamber of the double-acting cylinder 404 to the third solenoid valve 418 while the piston 408 moves in the first direction. For example, a size of flow passage of the first flow control valve 412 may be set manually. Alternatively and/or additionally, the size of flow passage of the first flow control valve 412 may be set digitally.

In some examples, while the piston 408 moves in the first direction, the third solenoid valve 418 may conduct fluid from the second solenoid valve 416 and/or the second chamber of the double-acting cylinder 404 into the vent valve 422, based upon the third signal 3. In some examples, a PWM period and/or a PWM frequency (e.g., associated with a clock of the PWM signal) of the third signal 3 may be based upon capabilities (e.g., switching capabilities) of the third solenoid valve 418.

In some examples, a first duty cycle of the third signal 3 may be based upon the output signal. For example, the first duty cycle may be based upon a position difference between the position of the piston 408 and the reference position (e.g., associated with the piston 408). For example, the first duty cycle may be proportional to the position difference. For example, a first position difference that is larger than a second position difference may be associated with a duty cycle that is higher than a duty cycle associated with the second position difference. For example, as the position difference decreases (e.g., and/or as the piston 408 moves in the first direction), the first duty cycle may decrease. For example, the first duty cycle may be 100% (e.g., or a different value) when the position difference is a maximum position difference and/or the first duty cycle may be 0% (e.g., or a different value) when the position difference is zero.

In some examples, the second solenoid valve 416 may be configured to conduct fluid from the tank 420 into the second chamber of the double-acting cylinder 404, based upon the first signal 1 and/or the second signal 2. For example, responsive to the first signal 1 having the second state, fluid may be conducted from the tank 420 into the second chamber of the double-acting cylinder 404 by the second solenoid valve 416. In some examples, while the second solenoid valve 416 conducts fluid from the tank 420 into the second chamber of the double-acting cylinder 404, the first solenoid valve 414 may not conduct fluid from the tank 420 into the double-acting cylinder 404.

The fluid being conducted from the tank 420 into the second chamber of the double-acting cylinder 404 may cause the piston 408 to move in the second direction. For example, fluid may enter the second chamber of the double-acting cylinder 404 such that the second portion of the double-acting cylinder 404 has a third pressure level (e.g., a third level of air pressure). Alternatively and/or additionally, the first portion of the double-acting cylinder 404 may comprise a fourth pressure level (e.g., a fourth level of air pressure). The third pressure level may be higher than the fourth pressure level which may cause the piston 408 to move in the second direction (e.g., backward direction).

While the piston 408 moves in the second direction, the first solenoid valve 414 may conduct fluid from the first chamber of the double-acting cylinder 404 (e.g., and/or the first portion of the double-acting cylinder 404) into the third solenoid valve 418, based upon the first signal 1 and/or the second signal 2. In some examples, the system 400 may comprise a second flow control valve 410 configured to regulate flow of fluid moving from the first chamber of the double-acting cylinder 404 to the third solenoid valve 418 while the piston 408 moves in the second direction. For example, a size of flow passage of the second flow control valve 410 may be set manually. Alternatively and/or additionally, the size of flow passage of the second flow control valve 410 may be set digitally.

In some examples, while the piston 408 moves in the second direction, the third solenoid valve 418 may conduct fluid from the first solenoid valve 414 and/or the first chamber of the double-acting cylinder 404 into the vent valve 422, based upon the third signal 3.

Figure 5:
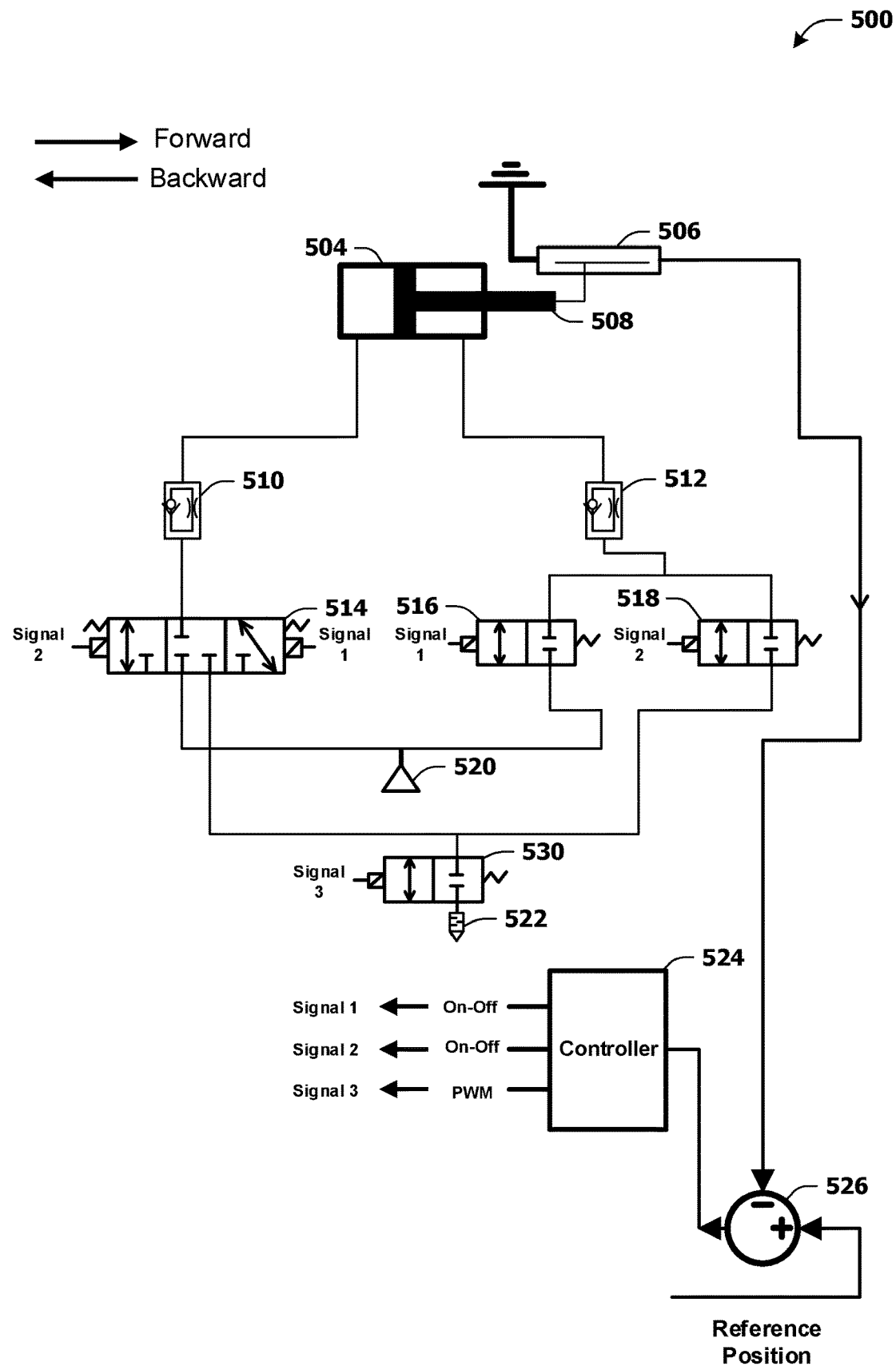
FIG. 5 is a component block diagram illustrating an exemplary system comprising a servo actuator.

FIG. 5 presents a structure of a system 500 comprising a servo actuator (e.g., an electrohydraulic servo actuator, an electro-pneumatic servo actuator, etc.). For example, the servo actuator may comprise a double-acting cylinder 504. The servo actuator may be configured to control a position of an object of the double-acting cylinder 504. In some examples, the object may be a piston 508. The piston 508 may move in a first direction and/or a second direction. The first direction may be labeled forward direction. The second direction may be labeled backward direction.

The servo actuator may comprise a first solenoid valve 514 (e.g., an on/off solenoid valve), a second solenoid valve 516 (e.g., an on/off solenoid valve) a third solenoid valve 518 (e.g., an on/off solenoid valve) and/or a fourth solenoid valve 530 (e.g., an on/off solenoid valve). For example, the first solenoid valve 514 may be a 3/3-way solenoid valve. Alternatively and/or additionally, the first solenoid valve 514 may be a different type of solenoid valve. The second solenoid valve 516 may be a 2/2-way solenoid valve. Alternatively and/or additionally, the second solenoid valve 516 may be a different type of solenoid valve. The third solenoid valve 518 may be a 2/2-way solenoid valve. Alternatively and/or additionally, the third solenoid valve 518 may be a different type of solenoid valve. The fourth solenoid valve 530 may be a 2/2-way solenoid valve. Alternatively and/or additionally, the fourth solenoid valve 530 may be a different type of solenoid valve.

In some examples, the system 500 may comprise a tank 520. The tank 520 may provide fluid used by the servo actuator. For example, the tank 520 may comprise compressed gas. The gas may be air and/or one or more inert gases. Alternatively and/or additionally, the tank 520 may comprise liquid. Alternatively and/or additionally, the system 500 may comprise a vent valve 522. The vent valve 522 may vent fluid from the servo actuator and/or the double-acting cylinder 504. In some examples, the vent valve 522 may comprise a silencing device in order to mitigate and/or reduce noise associated with venting fluid from the servo actuator (e.g., to reduce noise pollution).

In some examples, the system 500 may comprise a controller 524, a sensor 506 and/or a computing device 526. For example, the sensor 506 may be a position sensor and/or a different type of sensor. For example, the sensor 506 may detect one or more variables associated with a position of the piston 508. The sensor 506 may transmit a feedback signal comprising indications of the one or more variables to the computing device 526. The computing device 526 may generate an output signal (e.g., an error signal) based upon a comparison of the one or more variables with a reference parameter associated with a reference position of the piston 508 (e.g., a desired position of the piston 508).

For example, an operation (e.g., a mathematical operation comprising subtraction, addition, differentiation, integration and/or proportional calculation) may be performed on the one or more variables and the reference parameter to generate the output signal. The output signal may be transmitted to the controller 524. The controller 524 may control the first solenoid valve 514, the second solenoid valve 516, the third solenoid valve 518 and/or the fourth solenoid valve 530 based upon the output signal.

For example, the controller 524 may generate a first signal 1 (e.g., "Signal 1"), a second signal 2 (e.g., "Signal 2") and/or a third signal 3 (e.g., "Signal 3"). The first signal 1 and/or the second signal 2 may be on/off signals. For example, the first signal 1 and/or the second signal 2 may switch between a first state (e.g., a voltage representing 0) corresponding to deactivation (e.g., wherein a controlled solenoid valve may be de-energized and/or a controlled solenoid valve may operate in a state of a plurality of states) and a second state (e.g., a voltage representing 1) corresponding to activation (e.g., wherein a controlled solenoid valve may be energized and/or a controlled solenoid valve may operate in a state of a plurality of states). Alternatively and/or additionally, the third signal 3 may be a PWM signal.

In some examples, the first solenoid valve 514 may be controlled using the first signal 1 and/or the second signal 2. Alternatively and/or additionally, the second solenoid valve 516 may be controlled using the first signal 1. Alternatively and/or additionally, the third solenoid valve 518 may be controlled using the second signal 2. Alternatively and/or additionally, the fourth solenoid valve 530 may be controlled using the third signal 3.

In some examples, the first solenoid valve 514 may be configured to conduct fluid from the tank 520 into a first chamber of the double-acting cylinder 504 (e.g., the first chamber of the double-acting cylinder 504 may be associated with a left side of the double-acting cylinder 504 as shown in FIG. 5), based upon the second signal 2 and/or the first signal 1. For example, responsive to the second signal 2 having the second state, fluid may be conducted from the tank 520 into the first chamber of the double-acting cylinder 504 by the first solenoid valve 514. In some examples, while the first solenoid valve 514 conducts fluid from the tank 520 into the first chamber of the double-acting cylinder 504, the first signal 1 may have the first state and/or the second solenoid valve 516 may be closed and/or may not conduct fluid from the tank 520 into the double-acting cylinder 504.

The fluid being conducted from the tank 520 into the first chamber of the double-acting cylinder 504 may cause the piston 508 to move in the first direction. For example, fluid may enter the first chamber of the double-acting cylinder 504 such that a first portion of the double-acting cylinder 504 has a first pressure level (e.g., a first level of air pressure). The first portion of the double-acting cylinder 504 may be on a first side of the piston 508 (e.g., the first portion of the double-acting cylinder 504 may be on a left side of the piston 508 as shown in FIG. 5). Alternatively and/or additionally, a second portion of the double-acting cylinder 504 may comprise a second pressure level (e.g., a second level of air pressure). The second portion of the double-acting cylinder 504 may be on a second side of the piston 508 (e.g., the second portion of the double-acting cylinder 504 may be on a right side of the piston 508 as shown in FIG. 5). The first pressure level may be higher than the second pressure level which may cause the piston 508 to move in the first direction (e.g., forward direction).

While the piston 508 moves in the first direction, the third solenoid valve 518 may conduct fluid from a second chamber of the double-acting cylinder 504 (e.g., and/or the second portion of the double-acting cylinder 504) into the fourth solenoid valve 530, based upon the second signal 2 (e.g., the second chamber of the double-acting cylinder 504 may be associated with a right side of the double-acting cylinder 504 as shown in FIG. 5). In some examples, the system 500 may comprise a first flow control valve 512 configured to regulate flow of fluid moving from the second chamber of the double-acting cylinder 504 to the fourth solenoid valve 530 while the piston 508 moves in the first direction. For example, a size of flow passage of the first flow control valve 512 may be set manually. Alternatively and/or additionally, the size of flow passage of the first flow control valve 512 may be set digitally.

In some examples, while the piston 508 moves in the first direction, the fourth solenoid valve 530 may conduct fluid from the third solenoid valve 518 and/or the second chamber of the double-acting cylinder 504 into the vent valve 522, based upon the third signal 3. In some examples, a PWM period and/or a PWM frequency (e.g., associated with a clock of the PWM signal) of the third signal 3 may be based upon capabilities (e.g., switching capabilities) of the fourth solenoid valve 530.

In some examples, a first duty cycle of the third signal 3 may be based upon the output signal. For example, the first duty cycle may be based upon a position difference between the position of the piston 508 and the reference position (e.g., associated with the piston 508). For example, the first duty cycle may be proportional to the position difference. For example, a first position difference that is larger than a second position difference may be associated with a duty cycle that is higher than a duty cycle associated with the second position difference. For example, as the position difference decreases (e.g., and/or as the piston 508 moves in the first direction), the first duty cycle may decrease. For example, the first duty cycle may be 100% (e.g., or a different value) when the position difference is a maximum position difference and/or the first duty cycle may be 0% (e.g., or a different value) when the position difference is zero.

In some examples, the second solenoid valve 516 may be configured to conduct fluid from the tank 520 into the second chamber of the double-acting cylinder 504, based upon the first signal 1. For example, responsive to the first signal 1 having the second state, the second solenoid valve 516 may be activated (e.g., energized) and fluid may be conducted from the tank 520 into the second chamber of the double-acting cylinder 504. In some examples, while the second solenoid valve 516 conducts fluid from the tank 520 into the second chamber of the double-acting cylinder 504, the second signal 2 may have the first state and/or the first solenoid valve 514 may not conduct fluid from the tank 520 into the double-acting cylinder 504.

The fluid being conducted from the tank 520 into the second chamber of the double-acting cylinder 504 may cause the piston 508 to move in the second direction. For example, fluid may enter the second chamber of the double-acting cylinder 504 such that the second portion of the double-acting cylinder 504 has a third pressure level (e.g., a third level of air pressure). Alternatively and/or additionally, the first portion of the double-acting cylinder 504 may comprise a fourth pressure level (e.g., a fourth level of air pressure). The third pressure level may be higher than the fourth pressure level which may cause the piston 508 to move in the second direction (e.g., backward direction).

While the piston 508 moves in the second direction, the first solenoid valve 514 may conduct fluid from the first chamber of the double-acting cylinder 504 (e.g., and/or the first portion of the double-acting cylinder 504) into the fourth solenoid valve 530, based upon the first signal 1 and/or the second signal 2. In some examples, the system 500 may comprise a second flow control valve 510 configured to regulate flow of fluid moving from the first chamber of the double-acting cylinder 504 to the fourth solenoid valve 530 while the piston 508 moves in the second direction. For example, a size of flow passage of the second flow control valve 510 may be set manually. Alternatively and/or additionally, the size of flow passage of the second flow control valve 510 may be set digitally.

In some examples, while the piston 508 moves in the second direction, the fourth solenoid valve 530 may conduct fluid from the first solenoid valve 514 and/or the first chamber of the double-acting cylinder 504 into the vent valve 522, based upon the third signal 3.

Figure 6:
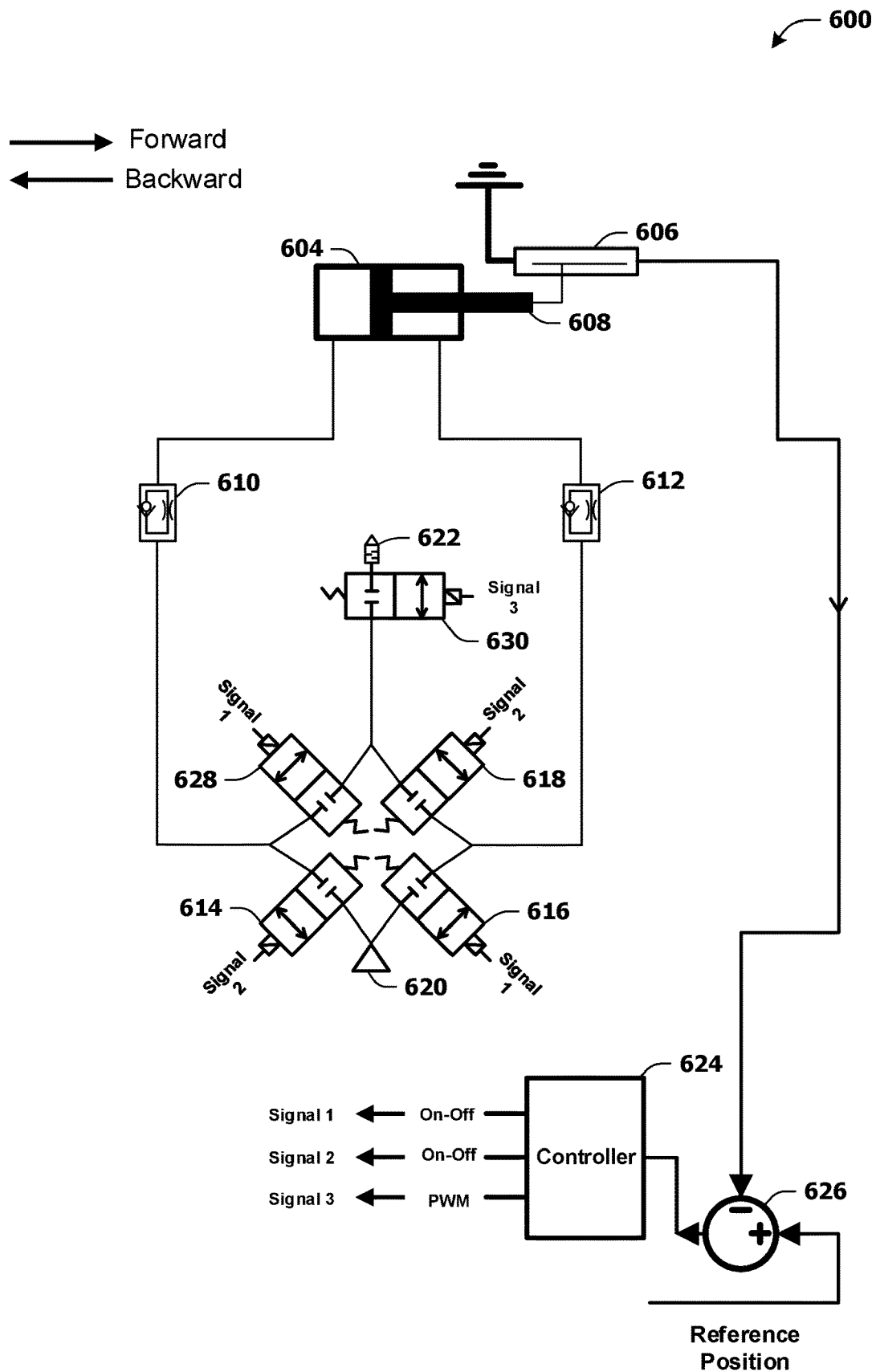
FIG. 6 is a component block diagram illustrating an exemplary system comprising a servo actuator.

FIG. 6 presents a structure of a system 600 comprising a servo actuator (e.g., an electrohydraulic servo actuator, an electro-pneumatic servo actuator, etc.). For example, the servo actuator may comprise a double-acting cylinder 604. The servo actuator may be configured to control a position of an object of the double-acting cylinder 604. In some examples, the object may be a piston 608. The piston 608 may move in a first direction and/or a second direction. The first direction may be labeled forward direction. The second direction may be labeled backward direction.

The servo actuator may comprise a first solenoid valve 614 (e.g., an on/off solenoid valve), a second solenoid valve 616 (e.g., an on/off solenoid valve) a third solenoid valve 618 (e.g., an on/off solenoid valve), a fourth solenoid valve 628 (e.g., an on/off solenoid valve) and/or a fifth solenoid valve 630. For example, the first solenoid valve 614 may be a 2/2-way solenoid valve. Alternatively and/or additionally, the first solenoid valve 614 may be a different type of solenoid valve. The second solenoid valve 616 may be a 2/2-way solenoid valve. Alternatively and/or additionally, the second solenoid valve 616 may be a different type of solenoid valve. The third solenoid valve 618 may be a 2/2-way solenoid valve. Alternatively and/or additionally, the third solenoid valve 618 may be a different type of solenoid valve. The fourth solenoid valve 628 may be a 2/2-way solenoid valve. Alternatively and/or additionally, the fourth solenoid valve 628 may be a different type of solenoid valve. The fifth solenoid valve 630 may be a 2/2-way solenoid valve. Alternatively and/or additionally, the fifth solenoid valve 630 may be a different type of solenoid valve.

In some examples, the system 600 may comprise a tank 620. The tank 620 may provide fluid used by the servo actuator. For example, the tank 620 may comprise compressed gas. The gas may be air and/or one or more inert gases. Alternatively and/or additionally, the tank 620 may comprise liquid. Alternatively and/or additionally, the system 600 may comprise a vent valve 622. The vent valve 622 may vent fluid from the servo actuator and/or the double-acting cylinder 604. In some examples, the vent valve 622 may comprise a silencing device in order to mitigate and/or reduce noise associated with venting fluid from the servo actuator (e.g., to reduce noise pollution).

In some examples, the system 600 may comprise a controller 624, a sensor 606 and/or a computing device 626. For example, the sensor 606 may be a position sensor and/or a different type of sensor. For example, the sensor 606 may detect one or more variables associated with a position of the piston 608. The sensor 606 may transmit a feedback signal comprising indications of the one or more variables to the computing device 626. The computing device 626 may generate an output signal (e.g., an error signal) based upon a comparison of the one or more variables with a reference parameter associated with a reference position of the piston 608 (e.g., a desired position of the piston 608).

For example, an operation (e.g., a mathematical operation comprising subtraction, addition, differentiation, integration and/or proportional calculation) may be performed on the one or more variables and the reference parameter to generate the output signal. The output signal may be transmitted to the controller 624. The controller 624 may control the first solenoid valve 614, the second solenoid valve 616, the third solenoid valve 618, the fourth solenoid valve 628 and/or the fifth solenoid valve 630 based upon the output signal.

For example, the controller 624 may generate a first signal 1 (e.g., "Signal 1"), a second signal 2 (e.g., "Signal 2") and/or a third signal 3 (e.g., "Signal 3"). The first signal 1 and/or the second signal 2 may be on/off signals. For example, the first signal 1 and/or the second signal 2 may switch between a first state (e.g., a voltage representing 0) corresponding to deactivation (e.g., wherein a controlled solenoid valve may be de-energized and/or a controlled solenoid valve may operate in a state of a plurality of states) and a second state (e.g., a voltage representing 1) corresponding to activation (e.g., wherein a controlled solenoid valve may be energized and/or a controlled solenoid valve may operate in a state of a plurality of states). Alternatively and/or additionally, the third signal 3 may be a PWM signal.

In some examples, the first solenoid valve 614 may be controlled using the second signal 2. Alternatively and/or additionally, the second solenoid valve 616 may be controlled using the first signal 1. Alternatively and/or additionally, the third solenoid valve 618 may be controlled using the second signal 2. Alternatively and/or additionally, the fourth solenoid valve 628 may be controlled using the first signal 1. Alternatively and/or additionally, the fifth solenoid valve 630 may be controlled using the third signal 3.

In some examples, the first solenoid valve 614 may be configured to conduct fluid from the tank 620 into a first chamber of the double-acting cylinder 604 (e.g., the first chamber of the double-acting cylinder 604 may be associated with a left side of the double-acting cylinder 604 as shown in FIG. 6), based upon the second signal 2. For example, responsive to the second signal 2 having the second state, the first solenoid valve 614 may be activated (e.g., energized) and/or fluid may be conducted from the tank 620 into the first chamber of the double-acting cylinder 604. In some examples, while the first solenoid valve 614 conducts fluid from the tank 620 into the first chamber of the double-acting cylinder 604, the first signal 1 may have the first state and/or the second solenoid valve 616 may be closed and/or may not conduct fluid from the tank 620 into the double-acting cylinder 604.

The fluid being conducted from the tank 620 into the first chamber of the double-acting cylinder 604 may cause the piston 608 to move in the first direction. For example, fluid may enter the first chamber of the double-acting cylinder 604 such that a first portion of the double-acting cylinder 604 has a first pressure level (e.g., a first level of air pressure). The first portion of the double-acting cylinder 604 may be on a first side of the piston 608 (e.g., the first portion of the double-acting cylinder 604 may be on a left side of the piston 608 as shown in FIG. 6). Alternatively and/or additionally, a second portion of the double-acting cylinder 604 may comprise a second pressure level (e.g., a second level of air pressure). The second portion of the double-acting cylinder 604 may be on a second side of the piston 608 (e.g., the second portion of the double-acting cylinder 604 may be on a right side of the piston 608 as shown in FIG. 6). The first pressure level may be higher than the second pressure level which may cause the piston 608 to move in the first direction (e.g., forward direction).

While the piston 608 moves in the first direction, the third solenoid valve 618 may conduct fluid from a second chamber of the double-acting cylinder 604 (e.g., and/or the second portion of the double-acting cylinder 606) into the fifth solenoid valve 630, based upon the second signal 2 (e.g., the second chamber of the double-acting cylinder 604 may be associated with a right side of the double-acting cylinder 604 as shown in FIG. 6). In some examples, the system 600 may comprise a first flow control valve 612 configured to regulate flow of fluid moving from the second chamber of the double-acting cylinder 604 to the fifth solenoid valve 630 while the piston 608 moves in the first direction. For example, a size of flow passage of the first flow control valve 612 may be set manually. Alternatively and/or additionally, the size of flow passage of the first flow control valve 612 may be set digitally.

In some examples, while the piston 608 moves in the first direction, the fifth solenoid valve 630 may conduct fluid from the third solenoid valve 618 and/or the second chamber of the double-acting cylinder 604 into the vent valve 622, based upon the third signal 3. In some examples, a PWM period and/or a PWM frequency (e.g., associated with a clock of the PWM signal) of the third signal 3 may be based upon capabilities (e.g., switching capabilities) of the fifth solenoid valve 630.

In some examples, a first duty cycle of the third signal 3 may be based upon the output signal. For example, the first duty cycle may be based upon a position difference between the position of the piston 608 and the reference position (e.g., associated with the piston 608). For example, the first duty cycle may be proportional to the position difference. For example, a first position difference that is larger than a second position difference may be associated with a duty cycle that is higher than a duty cycle associated with the second position difference. For example, as the position difference decreases (e.g., and/or as the piston 608 moves in the first direction), the first duty cycle may decrease. For example, the first duty cycle may be 100% (e.g., or a different value) when the position difference is a maximum position difference and/or the first duty cycle may be 0% (e.g., or a different value) when the position difference is zero.

In some examples, the second solenoid valve 616 may be configured to conduct fluid from the tank 620 into the second chamber of the double-acting cylinder 604, based upon the first signal 1. For example, responsive to the first signal 1 having the second state, the second solenoid valve 616 may be activated (e.g., energized) and fluid may be conducted from the tank 620 into the second chamber of the double-acting cylinder 604. In some examples, while the second solenoid valve 616 conducts fluid from the tank 620 into the second chamber of the double-acting cylinder 604, the second signal 2 may have the first state and/or the first solenoid valve 614 may not conduct fluid from the tank 620 into the double-acting cylinder 604.

The fluid being conducted from the tank 620 into the second chamber of the double-acting cylinder 604 may cause the piston 608 to move in the second direction. For example, fluid may enter the second chamber of the double-acting cylinder 604 such that the second portion of the double-acting cylinder 604 has a third pressure level (e.g., a third level of air pressure). Alternatively and/or additionally, the first portion of the double-acting cylinder 604 may comprise a fourth pressure level (e.g., a fourth level of air pressure). The third pressure level may be higher than the fourth pressure level which may cause the piston 608 to move in the second direction (e.g., backward direction).

While the piston 608 moves in the second direction, the fourth solenoid valve 628 may conduct fluid from the first chamber of the double-acting cylinder 604 (e.g., and/or the first portion of the double-acting cylinder 604) into the fifth solenoid valve 630, based upon the first signal 1. In some examples, the system 600 may comprise a second flow control valve 610 configured to regulate flow of fluid moving from the first chamber of the double-acting cylinder 604 to the fourth solenoid valve 628 while the piston 608 moves in the second direction. For example, a size of flow passage of the second flow control valve 610 may be set manually. Alternatively and/or additionally, the size of flow passage of the second flow control valve 610 may be set digitally.

In some examples, while the piston 608 moves in the second direction, the fifth solenoid valve 630 may conduct fluid from the fourth solenoid valve 628 and/or the first chamber of the double-acting cylinder 604 into the vent valve 622, based upon the third signal 3.

Figure 7:
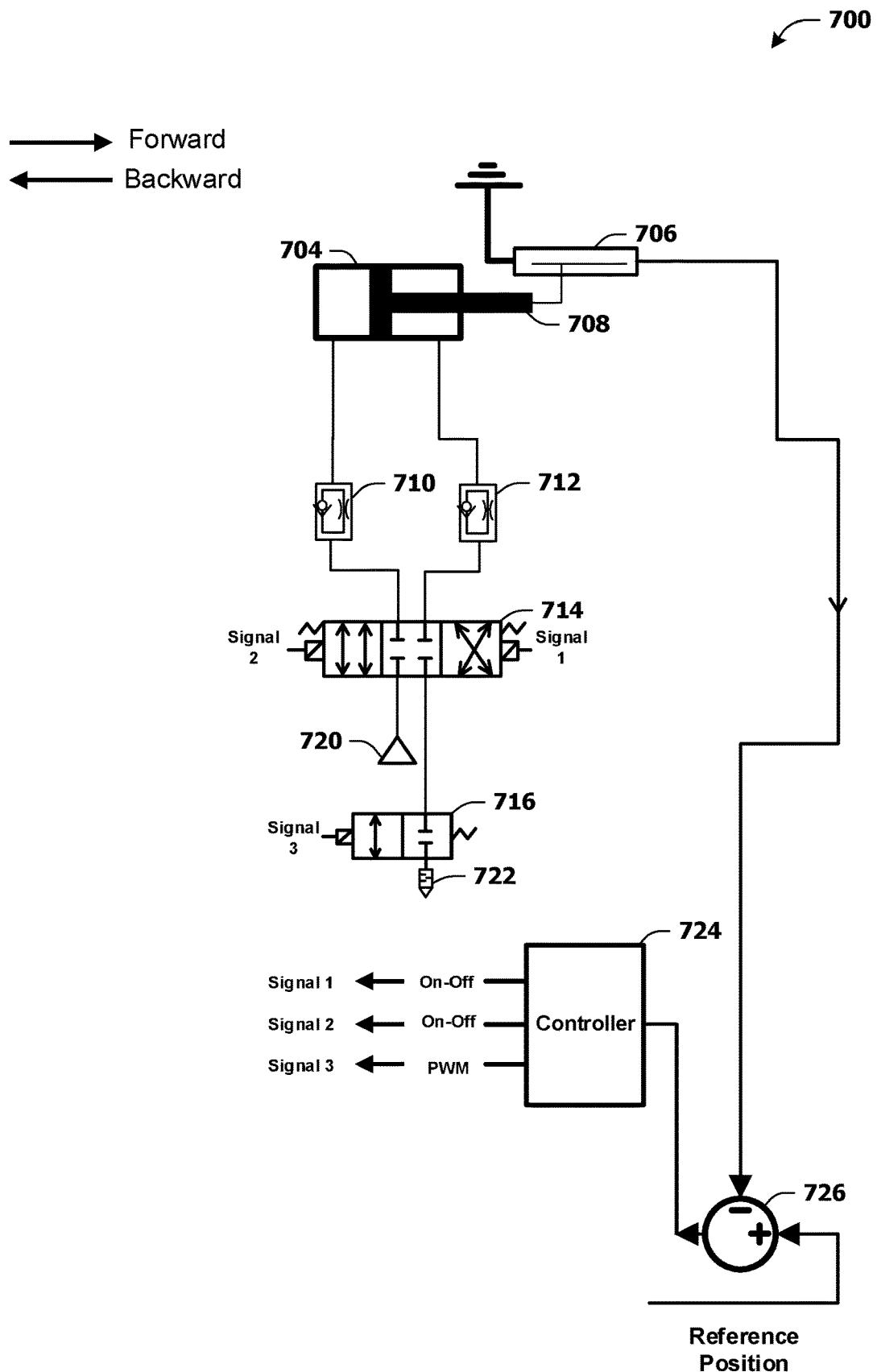
FIG. 7 is a component block diagram illustrating an exemplary system comprising a servo actuator

FIG. 7 presents a structure of a system 700 comprising a servo actuator (e.g., an electrohydraulic servo actuator, an electro-pneumatic servo actuator, etc.). For example, the servo actuator may comprise a double-acting cylinder 704. The servo actuator may be configured to control a position of an object of the double-acting cylinder 704. In some examples, the object may be a piston 708. The piston 708 may move in a first direction and/or a second direction. The first direction may be labeled forward direction. The second direction may be labeled backward direction.

The servo actuator may comprise a first solenoid valve 714 (e.g., an on/off solenoid valve) and/or a second solenoid valve 716. For example, the first solenoid valve 714 may be a four port three position (4/3-way) solenoid valve. Alternatively and/or additionally, the first solenoid valve 714 may be a different type of solenoid valve. The second solenoid valve 716 may be a 2/2-way solenoid valve. Alternatively and/or additionally, the second solenoid valve 716 may be a different type of solenoid valve.

In some examples, the system 700 may comprise a tank 720. The tank 720 may provide fluid used by the servo actuator. For example, the tank 720 may comprise compressed gas. The gas may be air and/or one or more inert gases. Alternatively and/or additionally, the tank 720 may comprise liquid. Alternatively and/or additionally, the system 700 may comprise a vent valve 722. The vent valve 722 may vent fluid from the servo actuator and/or the double-acting cylinder 704. In some examples, the vent valve 722 may comprise a silencing device in order to mitigate and/or reduce noise associated with venting fluid from the servo actuator (e.g., to reduce noise pollution).

In some examples, the system 700 may comprise a controller 724, a sensor 706 and/or a computing device 726. For example, the sensor 706 may be a position sensor and/or a different type of sensor. For example, the sensor 706 may detect one or more variables associated with a position of the piston 708. The sensor 706 may transmit a feedback signal comprising indications of the one or more variables to the computing device 726. The computing device 726 may generate an output signal (e.g., an error signal) based upon a comparison of the one or more variables with a reference parameter associated with a reference position of the piston 708 (e.g., a desired position of the piston 708).

For example, an operation (e.g., a mathematical operation comprising subtraction, addition, differentiation, integration and/or proportional calculation) may be performed on the one or more variables and the reference parameter to generate the output signal. The output signal may be transmitted to the controller 724. The controller 724 may control the first solenoid valve 714 and/or the second solenoid valve 716 based upon the output signal.

For example, the controller 724 may generate a first signal 1 (e.g., "Signal 1"), a second signal 2 (e.g., "Signal 2") and/or a third signal 3 (e.g., "Signal 3"). The first signal 1 and/or the second signal 2 may be on/off signals. For example, the first signal 1 and/or the second signal 2 may switch between a first state (e.g., a voltage representing 0) corresponding to deactivation (e.g., wherein a controlled solenoid valve may be de-energized and/or a controlled solenoid valve may operate in a state of a plurality of states) and a second state (e.g., a voltage representing 1) corresponding to activation (e.g., wherein a controlled solenoid valve may be energized and/or a controlled solenoid valve may operate in a state of a plurality of states). Alternatively and/or additionally, the third signal 3 may be a PWM signal.

In some examples, the first solenoid valve 714 may be controlled using the first signal 1 and/or the second signal 2. Alternatively and/or additionally, the second solenoid valve 716 may be controlled using the third signal 3.

In some examples, the first solenoid valve 714 may be configured to conduct fluid from the tank 720 into a first chamber of the double-acting cylinder 704 (e.g., the first chamber of the double-acting cylinder 704 may be associated with a left side of the double-acting cylinder 704 as shown in FIG. 7), based upon the second signal 2 and/or the first signal 1. For example, responsive to the second signal 2 having the second state, fluid may be conducted from the tank 720 into the first chamber of the double-acting cylinder 704 by the first solenoid valve 714. In some examples, while the first solenoid valve 714 conducts fluid from the tank 720 into the first chamber of the double-acting cylinder 704, the first signal 1 may have the first state.

The fluid being conducted from the tank 720 into the first chamber of the double-acting cylinder 704 may cause the piston 708 to move in the first direction. For example, fluid may enter the first chamber of the double-acting cylinder 704 such that a first portion of the double-acting cylinder 704 has a first pressure level (e.g., a first level of air pressure). The first portion of the double-acting cylinder 704 may be on a first side of the piston 708 (e.g., the first portion of the double-acting cylinder 704 may be on a left side of the piston 708 as shown in FIG. 7). Alternatively and/or additionally, a second portion of the double-acting cylinder 704 may comprise a second pressure level (e.g., a second level of air pressure). The second portion of the double-acting cylinder 704 may be on a second side of the piston 708 (e.g., the second portion of the double-acting cylinder 704 may be on a right side of the piston 708 as shown in FIG. 7). The first pressure level may be higher than the second pressure level which may cause the piston 708 to move in the first direction (e.g., forward direction).

While the piston 708 moves in the first direction, the first solenoid valve 714 may conduct fluid from a second chamber of the double-acting cylinder 704 (e.g., and/or the second portion of the double-acting cylinder 704) into the second solenoid valve 716, based upon the second signal 2 and/or the first signal 1 (e.g., the second chamber of the double-acting cylinder 704 may be associated with a right side of the double-acting cylinder 704 as shown in FIG. 7). In some examples, the system 700 may comprise a first flow control valve 712 configured to regulate flow of fluid moving from the second chamber of the double-acting cylinder 704 to the second solenoid valve 716 while the piston 708 moves in the first direction. For example, a size of flow passage of the first flow control valve 712 may be set manually. Alternatively and/or additionally, the size of flow passage of the first flow control valve 712 may be set digitally.

In some examples, while the piston 708 moves in the first direction, the second solenoid valve 716 may conduct fluid from the first solenoid valve 714 and/or the second chamber of the double-acting cylinder 704 into the vent valve 722, based upon the third signal 3. In some examples, a PWM period and/or a PWM frequency (e.g., associated with a clock of the PWM signal) of the third signal 3 may be based upon capabilities (e.g., switching capabilities) of the second solenoid valve 716.

In some examples, a first duty cycle of the third signal 3 may be based upon the output signal. For example, the first duty cycle may be based upon a position difference between the position of the piston 708 and the reference position (e.g., associated with the piston 708). For example, the first duty cycle may be proportional to the position difference. For example, a first position difference that is larger than a second position difference may be associated with a duty cycle that is higher than a duty cycle associated with the second position difference. For example, as the position difference decreases (e.g., and/or as the piston 708 moves in the first direction), the first duty cycle may decrease. For example, the first duty cycle may be 100% (e.g., or a different value) when the position difference is a maximum position difference and/or the first duty cycle may be 0% (e.g., or a different value) when the position difference is zero.

In some examples, the first solenoid valve 714 may be configured to conduct fluid from the tank 720 into the second chamber of the double-acting cylinder 704, based upon the first signal 1 and/or the second signal 2. For example, responsive to the first signal 1 having the second state, fluid may be conducted from the tank 720 into the second chamber of the double-acting cylinder 704 by the first solenoid valve 714. In some examples, while the first solenoid valve 714 conducts fluid from the tank 720 into the second chamber of the double-acting cylinder 704, the second signal 2 may have the first state.

The fluid being conducted from the tank 720 into the second chamber of the double-acting cylinder 704 may cause the piston 708 to move in the second direction. For example, fluid may enter the second chamber of the double-acting cylinder 704 such that the second portion of the double-acting cylinder 704 has a third pressure level (e.g., a third level of air pressure). Alternatively and/or additionally, the first portion of the double-acting cylinder 704 may comprise a fourth pressure level (e.g., a fourth level of air pressure). The third pressure level may be higher than the fourth pressure level which may cause the piston 708 to move in the second direction (e.g., backward direction).

While the piston 708 moves in the second direction, the first solenoid valve 714 may conduct fluid from the first chamber of the double-acting cylinder 704 (e.g., and/or the first portion of the double-acting cylinder 704) into the second solenoid valve 716, based upon the first signal 1 and/or the second signal 2. In some examples, the system 700 may comprise a second flow control valve 710 configured to regulate flow of fluid moving from the first chamber of the double-acting cylinder 704 to the second solenoid valve 716 while the piston 708 moves in the second direction. For example, a size of flow passage of the second flow control valve 710 may be set manually. Alternatively and/or additionally, the size of flow passage of the second flow control valve 710 may be set digitally.

In some examples, while the piston 708 moves in the second direction, the second solenoid valve 716 may conduct fluid from the first solenoid valve 714 and/or the first chamber of the double-acting cylinder 704 into the vent valve 722, based upon the third signal 3.

It may be appreciated that various embodiments having different arrangements and/or structures of servo actuators may be contemplated and that embodiments described herein are merely exemplary and are not limited to the system 200 of FIG. 2, the system 300 of FIG. 3, the system 400 of FIG. 4, the system 500 of FIG. 5, the system 600 of FIG. 6, and/or the system 700 of FIG. 7. For example, an exemplary servo actuator of the present disclosure having two 2/2-way solenoid valves may be used to design a servo actuator having a single 3/3-way solenoid valve instead of the two 2/2-way solenoid valves and vice-versa, an exemplary servo actuator of the present disclosure having a single 4/3-way solenoid valve may be used to configure a servo actuator having a 3/3-way solenoid valve and a 2/2-way solenoid valve instead of the single 4/3-way solenoid valve and vice-versa, etc.

It may be appreciated that structures of servo actuators provided herein may be less complex and/or less expensive to produce compared with structures of existing servo actuators.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:
1. A servo actuator, comprising:
a controller configured to control a plurality of solenoid valves based upon an output signal associated with a position of an object of a double-acting cylinder;

a set of one or more solenoid valves, of the plurality of solenoid valves, configured to:
conduct fluid from a tank into a first chamber of the double-acting cylinder, based upon a first signal received from the controller, in order to move the object in a first direction;
conduct fluid from the tank into a second chamber of the double-acting cylinder, based upon a second signal received from the controller, in order to move the object in a second direction, wherein the second direction is different than the first direction;
conduct fluid from the second chamber of the double-acting cylinder into a first solenoid valve while the object moves in the first direction, based upon the first signal; and
conduct fluid from the first chamber of the double-acting cylinder into the first solenoid valve while the object moves in the second direction, based upon the second signal; and
the first solenoid valve, of the plurality of solenoid valves, configured to conduct fluid from the set of one or more solenoid valves into a vent valve, based upon a pulse width modulation (PWM) signal received from the controller, wherein the first solenoid valve is a 2/2-way solenoid valve.

2. The servo actuator of claim 1, comprising a feedback device configured to:
detect one or more variables associated with the position of the object;
generate the output signal based upon a comparison of the one or more variables with a reference parameter; and
transmit the output signal to the controller.

3. The servo actuator of claim 1, wherein the servo actuator is configured to control a plant, wherein the plant comprises at least one of:
a control valve, wherein flow regulation associated with the control valve is controlled by the servo actuator;
a turbine associated with a first power plant, wherein a turbine speed, of the turbine, associated with an electricity frequency of first output power of the first power plant, is controlled by the servo actuator;
a generator associated with a second power plant, wherein an electric charge, of the generator, associated with an electricity frequency of second output power of the second power plant, is controlled by the servo actuator;
a first wind turbine, wherein a direction associated with a yaw axis of the first wind turbine is controlled by the servo actuator; or
a second wind turbine, wherein a pitch angle associated with the second wind turbine is controlled by the servo actuator.

4. The servo actuator of claim 1, the set of one or more solenoid valves consisting of a single solenoid valve configured to perform:
the conducting of fluid from the tank into the first chamber of the double-acting cylinder;
the conducting of fluid from the tank into the second chamber of the double-acting cylinder;
the conducting of fluid from the second chamber of the double-acting cylinder into the first solenoid valve; and
the conducting of fluid from the first chamber of the double-acting cylinder into the first solenoid valve.

5. The servo actuator of claim 4, wherein the single solenoid valve is a four port three position (4/3-way) solenoid valve.

6. The servo actuator of claim 1, the set of one or more solenoid valves comprising:

a second solenoid valve configured to perform:
the conducting of fluid from the tank into the first chamber of the double-acting cylinder; and
the conducting of fluid from the first chamber of the double-acting cylinder into the first solenoid valve; and
a third solenoid valve configured to perform:
the conducting of fluid from the tank into the second chamber of the double-acting cylinder; and
the conducting of fluid from the second chamber of the double-acting cylinder into the first solenoid valve.

7. The servo actuator of claim 6, wherein:
the second solenoid valve is a three port three position (3/3-way) solenoid valve; and
the third solenoid valve is a 3/3-way solenoid valve.

8. The servo actuator of claim 1, the set of one or more solenoid valves comprising:
a second solenoid valve configured to perform:
the conducting of fluid from the tank into the first chamber of the double-acting cylinder; and
the conducting of fluid from the first chamber of the double-acting cylinder into the first solenoid valve;
a third solenoid valve configured to perform the conducting of fluid from the tank into the second chamber of the double-acting cylinder; and
a fourth solenoid valve configured to perform the conducting of fluid from the second chamber of the double-acting cylinder into the first solenoid valve.

9. The servo actuator of claim 8, wherein:
the second solenoid valve is a 3/3-way solenoid valve;
the third solenoid valve is a two port two position (2/2-way) solenoid valve; and
the fourth solenoid valve is a 2/2-way solenoid valve.

10. The servo actuator of claim 1, the set of one or more solenoid valves comprising:
a second solenoid valve configured to perform the conducting of fluid from the tank into the first chamber of the double-acting cylinder;
a third solenoid valve configured to perform the conducting of fluid from the tank into the second chamber of the double-acting cylinder;
a fourth solenoid valve configured to perform the conducting of fluid from the second chamber of the double-acting cylinder into the first solenoid valve; and
a fifth solenoid valve configured to perform the conducting of fluid from the first chamber of the double-acting cylinder into the first solenoid valve.

11. The servo actuator of claim 10, wherein:
the second solenoid valve is a 2/2-way solenoid valve;
the third solenoid valve is a 2/2-way solenoid valve;
the fourth solenoid valve is a 2/2-way solenoid valve; and
the fifth solenoid valve is a 2/2-way solenoid valve.

12. The servo actuator of claim 1, wherein:
the first solenoid valve is an on/off solenoid valve; and
the PWM signal is generated by the controller based upon the output signal.

13. A servo actuator, comprising:
a controller configured to control a plurality of solenoid valves based upon an output signal associated with a position of an object of a double-acting cylinder;
a first solenoid valve, of the plurality of solenoid valves, configured to:
conduct fluid from a tank into a first chamber of the double-acting cylinder, based upon a first signal received from the controller, in order to move the object in a first direction; and conduct fluid from the first chamber of the double-acting cylinder into a vent valve while the object moves in a second direction, based upon a first PWM signal received from the controller, wherein the second direction is different than the first direction, and wherein the first solenoid valve is a 3/3-way solenoid valve;

a second solenoid valve, of the plurality of solenoid valves, configured to conduct fluid from the tank into a second chamber of the double-acting cylinder, based upon a second signal received from the controller, in order to move the object in the second direction, wherein the second solenoid valve is a 2/2-way solenoid valve; and a third solenoid valve, of the plurality of solenoid valves, configured to conduct fluid from the second chamber of the double-acting cylinder into the vent valve while the object moves in the first direction, based upon a second PWM signal received from the controller, wherein the third solenoid valve is a 2/2-way solenoid valve.

14. The servo actuator of claim 13, comprising a feedback device configured to:
    detect one or more variables associated with the position of the object;
    generate the output signal based upon a comparison of the one or more variables with a reference parameter; and
    transmit the output signal to the controller.

15. The servo actuator of claim 13, wherein the servo actuator is configured to control a plant, wherein the plant comprises at least one of:
    a control valve, wherein flow regulation associated with the control valve is controlled by the servo actuator;
    a turbine associated with a first power plant, wherein a turbine speed, of the turbine, associated with an electricity frequency of first output power of the first power plant, is controlled by the servo actuator;
    a generator associated with a second power plant, wherein an electric charge, of the generator, associated with an electricity frequency of second output power of the second power plant, is controlled by the servo actuator;
    a first wind turbine, wherein a direction associated with a yaw axis of the first wind turbine is controlled by the servo actuator; or
    a second wind turbine, wherein a pitch angle associated with the second wind turbine is controlled by the servo actuator.

16. The servo actuator of claim 13, wherein:
    the first solenoid valve is an on/off solenoid valve;
    the second solenoid valve is an on/off solenoid valve; and
    the third solenoid valve is an on/off solenoid valve.

17. A servo actuator, comprising:
    a controller configured to control a plurality of solenoid valves based upon an output signal associated with a position of an object of a single-acting cylinder;
    a first solenoid valve, of the plurality of solenoid valves, configured to conduct fluid from a tank into a second solenoid valve, based upon a first signal received from the controller, in order to move the object in a first direction, wherein the first solenoid valve is a 2/2-way solenoid valve;
    a third solenoid valve, of the plurality of solenoid valves, configured to conduct fluid from the second solenoid valve into a vent valve, based upon a second signal received from the controller, while the object moves in a second direction, wherein the second direction is different than the first direction, and wherein the third solenoid valve is a 2/2-way solenoid valve; and
    the second solenoid valve, of the plurality of solenoid valves, configured to:
        conduct fluid from the first solenoid valve into the single-acting cylinder, based upon a PWM signal, in order to move the object in the first direction; and
        conduct fluid from the single-acting cylinder into the third solenoid valve, based upon the PWM signal, while the object moves in the second direction, wherein the second solenoid valve is a 2/2-way solenoid valve.

18. The servo actuator of claim 17, comprising a feedback device configured to:
    detect one or more variables associated with the position of the object;
    generate the output signal based upon a comparison of the one or more variables with a reference parameter; and
    transmit the output signal to the controller.

19. The servo actuator of claim 17, wherein the servo actuator is configured to control a plant, wherein the plant comprises at least one of:
    a control valve, wherein flow regulation associated with the control valve is controlled by the servo actuator;
    a turbine associated with a first power plant, wherein a turbine speed, of the turbine, associated with an electricity frequency of first output power of the first power plant, is controlled by the servo actuator;
    a generator associated with a second power plant, wherein an electric charge, of the generator, associated with an electricity frequency of second output power of the second power plant, is controlled by the servo actuator;
    a first wind turbine, wherein a direction associated with a yaw axis of the first wind turbine is controlled by the servo actuator; or
    a second wind turbine, wherein a pitch angle associated with the second wind turbine is controlled by the servo actuator.

20. The servo actuator of claim 17, wherein:
    the first solenoid valve is an on/off solenoid valve;
    the second solenoid valve is an on/off solenoid valve; and
    the third solenoid valve is an on/off solenoid valve.

* * * * *